United States Patent
Kamei et al.

(10) Patent No.: US 11,114,833 B2
(45) Date of Patent: Sep. 7, 2021

(54) WIRE EXTERIOR BODY AND EXTERIOR-COVERED WIRE HARNESS

(71) Applicants: FURUKAWA ELECTRIC CO., LTD., Tokyo (JP); FURUKAWA AUTOMOTIVE SYSTEMS INC., Shiga (JP)

(72) Inventors: Yoshikazu Kamei, Tokyo (JP); Takashi Oshino, Tokyo (JP); Hideyuki Ikeda, Tokyo (JP); Naoyuki Kojima, Tokyo (JP); Koichi Maeno, Tokyo (JP)

(73) Assignees: FURUKAWA ELECTRIC CO., LTD., Tokyo (JP); FURUKAWA AUTOMOTIVE SYSTEMS INC., Inukami-Gun (JP)

( * ) Notice: Subject to any disclaimer, the term of this patent is extended or adjusted under 35 U.S.C. 154(b) by 0 days.

(21) Appl. No.: 16/958,567

(22) PCT Filed: Dec. 27, 2018

(86) PCT No.: PCT/JP2018/048070
§ 371 (c)(1),
(2) Date: Jun. 26, 2020

(87) PCT Pub. No.: WO2019/131848
PCT Pub. Date: Jul. 4, 2019

(65) Prior Publication Data
US 2020/0343708 A1    Oct. 29, 2020

(30) Foreign Application Priority Data

Dec. 28, 2017 (JP) .............................. JP2017-254624
Dec. 28, 2017 (JP) .............................. JP2017-254625

(51) Int. Cl.
*H02G 3/30* (2006.01)
*H01B 7/40* (2006.01)
(Continued)

(52) U.S. Cl.
CPC ........... *H02G 3/30* (2013.01); *B60R 16/0215* (2013.01); *H01B 7/0045* (2013.01);
(Continued)

(58) Field of Classification Search
CPC ... H02G 3/30; H02G 3/04; H01B 7/00; H01B 7/18; B60R 16/02
(Continued)

(56) References Cited

U.S. PATENT DOCUMENTS 5,806,812 A * 9/1998 Jacobs ................ B60R 16/0215
248/73
2003/0213607 A1* 11/2003 Katsumata .............. E05D 5/062
174/68.3

(Continued)

FOREIGN PATENT DOCUMENTS

| CN | 105359362 A | 2/2016 |
|---|---|---|
| CN | 205070342 U | 3/2016 |

(Continued)

OTHER PUBLICATIONS

International Preliminary Report on Patentability, dated Jul. 9, 2020, and English translation of the Written Opinion of the International Searching Authority, dated Mar. 26, 2019, (Forms PCT/IB/338, PCT/IB/373, and PCT/ISA/237) for International Application No. PCT/JP2018/048070.

(Continued)

*Primary Examiner* — Timothy J Thompson
*Assistant Examiner* — Michael F McAllister
(74) *Attorney, Agent, or Firm* — Birch, Stewart, Kolasch & Birch, LLP

(57) ABSTRACT

A wire exterior body and an exterior-covered wire harness in which damage by an attaching member is prevented are provided. A wire exterior body (3) to be mounted on the outer periphery of an electric wire (wire harness) (2), the (Continued)

wire exterior body being formed of a resin sheet that is bent, includes a plurality of wall parts (4) extending along an extending direction of the electric wire and forming an accommodating part (5) that accommodates the electric wire. Among the plurality of the wall parts (4), at least one wall part (upper lid wall part (45)) has a through-hole (47), penetrating in a thickness direction of the resin sheet, into which an attaching member (61) attachable to a vehicle body is inserted, and a groove (a lower surface groove (48) or an upper surface groove (49)) in which a thickness of the resin sheet is reduced is formed on a part around the through-hole (47) on at least one surface of an upper surface (45*c*) and a lower surface (45*d*) facing the thickness direction.

21 Claims, 11 Drawing Sheets

(51) Int. Cl.
    *B60R 16/02*     (2006.01)
    *H01B 7/00*     (2006.01)
    *H01B 7/18*     (2006.01)
    *H02G 3/04*     (2006.01)

(52) U.S. Cl.
    CPC .............. *H01B 7/1805* (2013.01); *H01B 7/40* (2013.01); *H02G 3/0406* (2013.01)

(58) Field of Classification Search
    USPC ........................................................ 174/480
    See application file for complete search history.

(56) References Cited

U.S. PATENT DOCUMENTS

| | | | |
|---|---|---|---|
| 2005/0217888 A1* | 10/2005 | Arai | ..................... H02G 3/0418 174/72 A |
| 2016/0156165 A1 | 6/2016 | Katou et al. | |
| 2016/0329770 A1 | 11/2016 | Ishii et al. | |
| 2017/0129424 A1 | 5/2017 | Nagahashi et al. | |

FOREIGN PATENT DOCUMENTS

| | | |
|---|---|---|
| CN | 106062890 A | 10/2016 |
| CN | 106575860 A | 4/2017 |
| CN | 206697872 U | 12/2017 |
| JP | 64-81610 A | 3/1989 |
| JP | 9-46851 A | 2/1997 |
| JP | 2006-246663 A | 9/2006 |
| JP | 2011-223650 A | 11/2011 |
| JP | 2015-47057 A | 3/2015 |
| JP | 2015-126668 A | 7/2015 |
| JP | 2015-231248 A | 12/2015 |
| JP | 2017-28903 A | 2/2017 |
| JP | 2017-55510 A | 3/2017 |

OTHER PUBLICATIONS

International Search Report for PCT/JP2018/048070 dated Mar. 26, 2019.
Written Opinion of the International Searching Authority for PCT/JP2018/048070 (PCT/ISA/237) dated Mar. 26, 2019.
Chinese Office Action and Search Report for Chinese Application No. 201880084243.4, dated Feb. 2, 2021, with English translation.

* cited by examiner

WIRE EXTERIOR BODY AND EXTERIOR-COVERED WIRE HARNESS

CROSS REFERENCE TO RELATED APPLICATIONS

This application is the National Phase of PCT International Application No. PCT/JP2018/048070, filed on Dec. 27, 2018, which claims priority under 35 U.S.C. 119(a) to Patent Application Nos. 2017-254624, filed in Japan on Dec. 28, 2017; and 2017-254625, filed in Japan on Dec. 28, 2017, all of which are hereby expressly incorporated by reference into the present application.

TECHNICAL FIELD

The present invention relates to a wire exterior body to be mounted on the outer periphery of an electrical wire such as a wire harness, and an exterior-covered wire harness. The present invention also relates to a wire exterior body to be mounted on the outer periphery of an electrical wire, and an exterior-covered wire harness, and particularly relates to a wire exterior body including a branch portion and/or a bent portion in the wire extending direction, and an exterior-covered wire harness.

BACKGROUND ART

As a wire exterior body to be mounted on the outer periphery of an electric wire to be routed in a vehicle or the like, a protector for protecting a wire bundle from external forces has been known. In such a protector, a plate member is bent in a form of doubly surrounding the periphery of a wire bundle to form an accommodating space in a longitudinal cylindrical shape for accommodating the wire bundle (see Patent Literature 1).

The protector has a through-hole into which a locking part for attaching to a vehicle body is to be inserted. Then, with a pair of fixing chips of the locking part inserted in the through-hole sandwiching a portion where the plate member is overlapped, the overlapped state of the plate member is maintained and the locking part can be inserted into the attachment hole of a vehicle body.

Conventionally, an exterior body for a wire harness is used for attaching and fixing the wire harness to a vehicle body or the like. Further, when the wire harness is accommodated in an accommodating part of the exterior body, the exterior body exhibits a function of regulating the route of the wire harness and a function of protecting the wire harness. To regulate the route of the wire harness, the exterior body may be provided with a branch portion and/or a bent portion in the extending direction of the electric wire.

Furthermore, from the viewpoint of light weight and the like, an exterior body formed of a resin sheet that is bent is also considered. In an exterior body formed of a resin sheet that is bent, a branch portion and/or a bent portion has room for improving the mechanical strength, in particular, mechanical strength with respect to a stress from an orthogonal direction to the extending direction of the wire harness. If the mechanical strength in the branch portion and/or bent portion is not sufficient, a protective function with respect to the wire harness is lowered in the branch portion and/or bent portion, and workability for attaching the exterior-covered wire harness to a vehicle body panel or the like may be lowered.

Meanwhile, as an exterior body provided with a bent portion, an exterior body including a plurality of side plate parts linked to make an angle along the peripheral direction of the exterior body and a bendable portion has been proposed. The bendable portion can be bent by a bellows part that is formed such that a plurality of peak top portions and a plurality of valley bottom portions are alternately formed along the axial direction of the exterior body in the plurality of side plate parts (Patent Literature 2).

However, even in Patent Literature 2, the bellows part still has room for improving the mechanical strength. Further, in order to produce a bellows structure, there is not only a problem that higher processing costs are required but also a problem that extra materials are required. Furthermore, in Patent Literature 2, since the bendable portion is not fixed, workability for attaching the wire harness that is bent to be routed to a vehicle cannot be obtained.

DOCUMENT LIST

Patent Literatures

Patent Literature 1: Japanese Patent Application Publication No. 2017-055510
Patent Literature 2: Japanese Patent Application Publication No. 2015-126668

SUMMARY OF INVENTION

Technical Problem

However, in the conventional protector described above, a stress is generated in the portion where the locking part and the plate member is joined due to vibration during traveling of a vehicle, which may damage the protector. Therefore, a wire exterior body and an exterior-covered wire harness in which damage by an attaching member for attaching to a vehicle body is prevented has been required.

The present invention has been made in view of the aforementioned problem, and it is an object of the present invention to provide a wire exterior body and an exterior-covered wire harness in which damage by an attaching member is prevented.

The present invention has been made in view of the aforementioned condition, and it is an object of the present invention to provide a wire exterior body having excellent mechanical strength even in a branch portion and/or a bent portion, having an excellent protective function with respect to electric wires, and having excellent workability when attaching an exterior-covered wire harness to a vehicle panel or the like.

Solution to Problem

[1] In order to achieve the objects described above, a wire exterior body of the present invention is a wire exterior body to be mounted on an outer periphery of an electric wire, the wire exterior body being formed of a resin sheet that is bent. The wire exterior body includes a plurality of wall parts extending along an extending direction of the electric wire and forming an accommodating part that accommodates the electric wire. Among the plurality of wall parts, at least one wall part has a through-hole, penetrating in a thickness direction of the resin sheet, into which an attaching member attachable to a vehicle body is inserted, and a groove in which a thickness of the resin sheet is reduced is formed on a part around the through-hole on at least one surface of an upper surface and a lower surface facing the thickness direction.

[2] In the wire exterior body of the present invention, the groove is formed at positions facing each other over the through-hole.

[3] In the wire exterior body of the present invention, the groove is an annular groove surrounding the through-hole.

[4] In the wire exterior body of the present invention, the width of the groove is 0.7 mm or more and 0.9 mm or less.

[5] In the wire exterior body of the present invention, the depth of the groove is 60% or more and 80% or less of the thickness of the resin sheet.

[6] In the wire exterior body of the present invention, the density of the resin sheet in the groove is higher than the density of the resin sheet except for the groove in the upper surface and the lower surface facing the thickness direction, and is 400 $Kg/m^3$ or more and 1200 $Kg/m^3$ or less.

[7] In order to achieve the objects described above, an exterior-covered wire harness of the present invention includes a wire harness and the wire exterior body, and the wire exterior body is characterized as to be mounted on an outer periphery of the wire harness.

[8] An aspect of the present invention is a wire exterior body to be mounted on an outer periphery of an electric wire, the wire exterior body being formed of a resin sheet that is bent. The wire exterior body includes a plurality of wall parts extending along an extending direction of the electric wire and forming an accommodating part that accommodates the electric wire. The plurality of the wall parts includes a branch portion and/or a bent portion in the extending direction of the electric wire, and among the plurality of the wall parts, two wall parts facing each other over the accommodating part are provided across the branch portion and/or bent portion along the extending direction of the electric wire.

[9] The wire exterior body according to [8], wherein branching of the branch portion and/or bending of the bent portion is formed toward a short direction of the two wall parts facing each other.

[10] An aspect of the present invention is the wire exterior body according to [8] or [9], wherein one wall part forming the two wall parts facing each other is joined to at least one of the plurality of the wall parts in a direction extending from the branch portion and/or bent portion.

[11] An aspect of the present invention is the wire exterior body according to any one of [8] to [10], wherein at least a partial area of one wall part forming the two wall parts facing each other includes a wall-surface overlapping portion that overlaps at least one of the plurality of the wall parts, and in the wall-surface overlapping portion, the one wall part is joined to at least one of the plurality of the wall parts.

[12] An aspect of the present invention is the wire exterior body according to [11], wherein the one wall part is divided in the wall-surface overlapping portion to thereby form a boundary portion, and the one wall part is joined to at least one of the plurality of the wall parts in the boundary portion.

[13] An aspect of the present invention is the wire exterior body according to any one of [8] to [12], wherein the resin sheet is a thermoplastic resin foamed sheet.

[14] An aspect of the present invention is the wire exterior body according to [13], wherein the density of the thermoplastic resin foamed sheet except for a bending portion is 200 $Kg/m^3$ or more and 700 $Kg/m^3$ or less.

[15] An aspect of the present invention is the wire exterior body according to [13] or [14], wherein the thickness of the thermoplastic resin foamed sheet except for a bending portion is 0.50 mm or more and 4.0 mm or less.

[16] An aspect of the present invention is the wire exterior body according to any one of [13] to [15], wherein the density of a bending portion of the thermoplastic resin foamed sheet is 400 $Kg/m^3$ or more and 1200 $Kg/m^3$ or less.

[17] An aspect of the present invention is the wire exterior body according to any one of [13] to [16], wherein the thermoplastic resin foamed sheet includes a curved portion having R 0.1 mm or more and 1.0 mm or less in a cut surface.

[18] An aspect of the present invention is the wire exterior body according to any one of [13] to [17], wherein the thermoplastic resin foamed sheet includes a non-foam layer on both surfaces.

[19] An aspect of the present invention is the wire exterior body according to [18], wherein the thickness of the non-foam layer is 10 μm or more and 100 μm or less.

[20] An aspect of the present invention is the wire exterior body according to any one of [13] to [19], wherein Shore hardness (HSC) of the thermoplastic resin foamed sheet is 60 or more and 100 or less.

[21] An aspect of the present invention is an exterior-covered wire harness including a wire harness and the wire exterior body according to any one of [8] to [20], and the wire exterior body is mounted on the outer periphery of the wire harness.

Effects of Invention

According to a wire exterior body and an exterior-covered wire harness of the present invention, it is possible to prevent damage caused by an attaching member.

According to an aspect of the wire exterior body of the present invention, since two wall parts facing each other over the accommodating part, among the plurality of the wall parts, are provided across the branch portion and/or bent portion along the extending direction of the electric wire, it is possible to obtain a wire exterior body having excellent mechanical strength even in the branch portion and/or the bent portion, having an excellent protective function with respect to the electric wire, and having excellent workability when attaching an exterior-covered wire harness to a vehicle panel or the like.

Further, since the mechanical strength is excellent even in the branch portion and/or bent portion, even if an exterior-covered wire harness is attached to a vehicle in which vibration is likely to be generated such as an automobile, it is possible to prevent vibration sound from being generated from the exterior-covered wire harness. Furthermore, since the wire exterior body includes two wall parts facing each other that are provided across the branch portion and/or bent portion, durability of the branch portion and/or bent portion is improved.

According to an aspect of the wire exterior body of the present invention, one wall part of the two wall parts facing each other is fixed to at least one of the plurality of the wall parts in a direction extending from the branch portion and/or bent portion, the mechanical strength in the branch portion and/or bent portion is further improved.

According to an aspect of the wire exterior body of the present invention, the one wall part is divided in a wall-surface overlapping portion to thereby form a boundary portion, and the one wall part is fixed to at least one of the plurality of the wall parts in the boundary portion, efficiency of the fixing work is improved.

BRIEF DESCRIPTION OF DRAWINGS

FIG. 3A, 3B A view for showing an example of an attaching member, to be engaged with the exterior body of the first embodiment of the present invention, for attaching the exterior body to a vehicle body, in which FIG. 3A is a perspective view of the attaching member and FIG. 3B is a plan view of the attaching member.

FIG. 7A, 7B A view for showing an example of an attaching member for attaching the exterior body of the second embodiment of the present invention to a vehicle body, in which FIG. 7A is a perspective view of the attaching member and FIG. 7B is a plan view of the attaching member.

DESCRIPTION OF EMBODIMENTS

Hereinafter, embodiments of the present invention will be specifically described with reference to the drawings.

Figure 1:
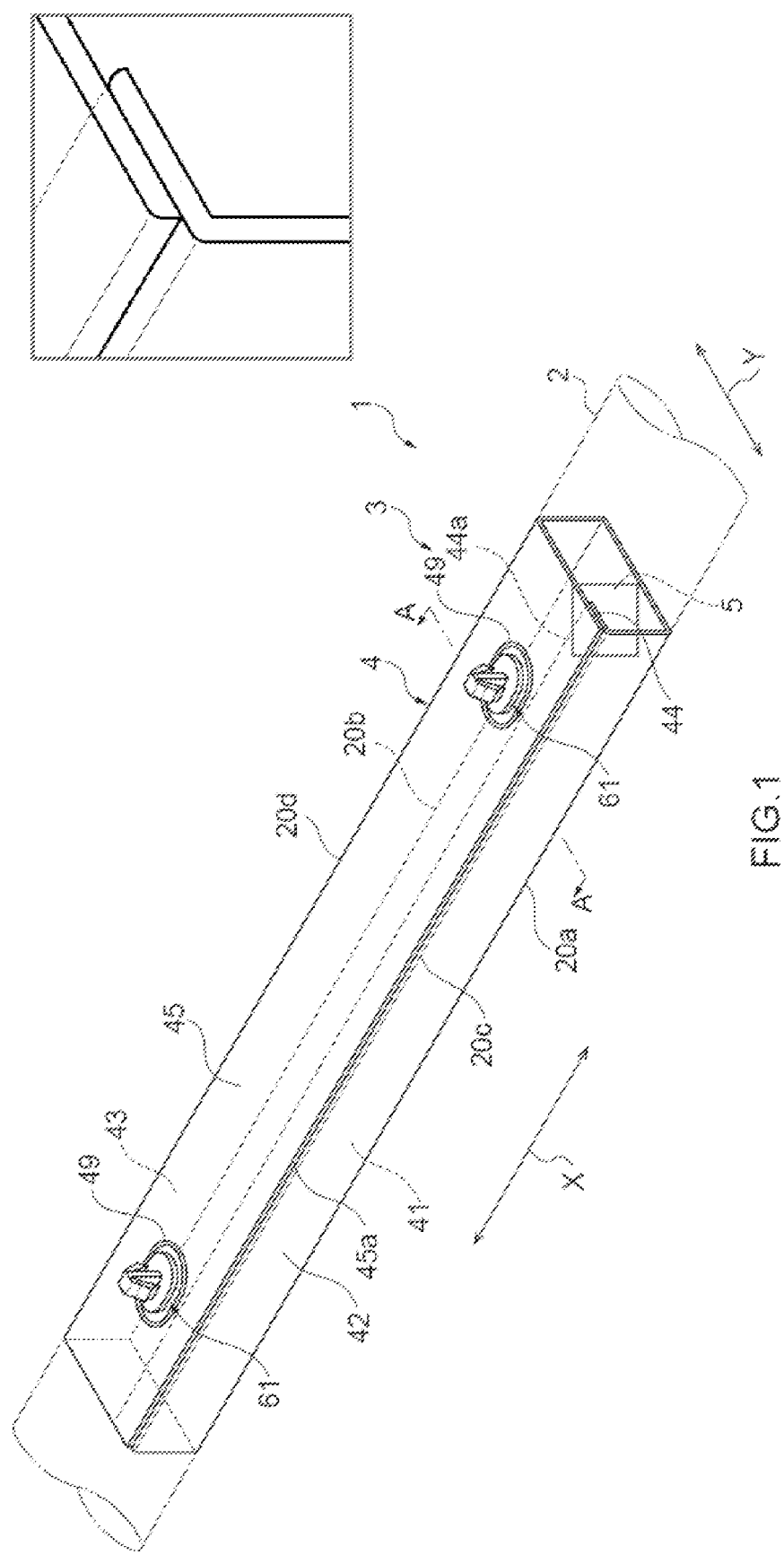
FIG. 1 A perspective view showing an exterior body and an exterior-covered wire harness of a first embodiment of the present invention.

First, a configuration of an exterior-covered wire harness of a first embodiment of the present invention will be described with reference to FIG. 1. FIG. 1 is a perspective view showing an exterior body 3 and an exterior-covered wire harness 1 of the first embodiment of the present invention.

Note that a longitudinal direction (length direction) of the exterior body 3 is assumed to be "X" and a short direction (width direction) of the exterior body 3 is assumed to be "Y" for convenience of description.

As shown in FIG. 1, the exterior-covered wire harness 1 according to the first embodiment of the present invention includes a wire harness 2 in which a plurality of electric wires are bundled, and an exterior body for an electric wire (hereinafter, also referred to as "exterior body") 3 to be mounted on the outer periphery of the wire harness 2. The wire harness 2 is protected from the external environment by the exterior body 3. Note that in FIG. 1, while the wire harness 2 is shown in one columnar shape, the wire harness 2 is one including one or more electric wires. In the exterior-covered wire harness 1 of the first embodiment of the present invention, a plurality of (two, in the first embodiment of the present invention) attaching members 61 for attaching to a vehicle (not shown) are engaged near the center in the short direction Y.

Figure 2:
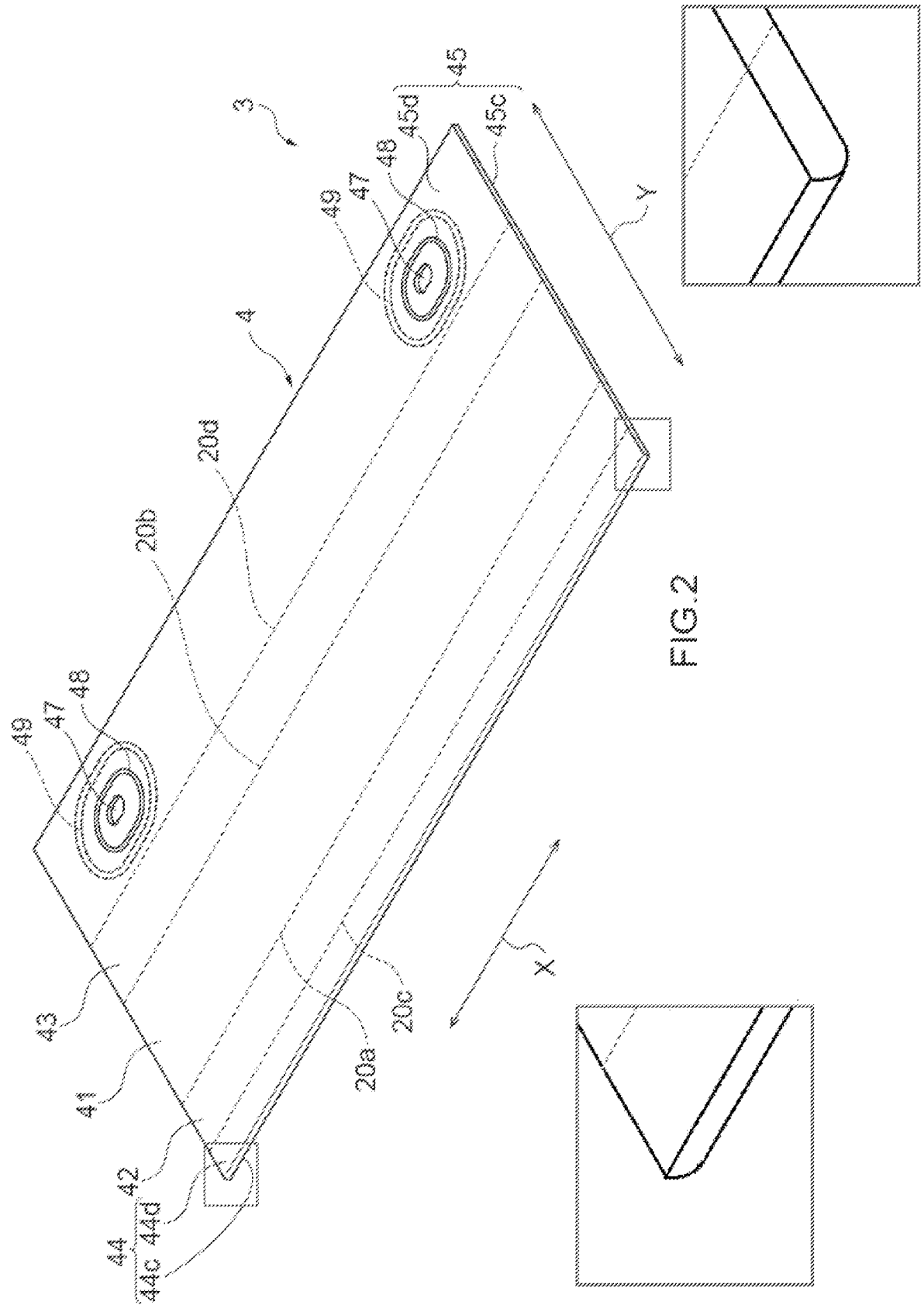
FIG. 2 A perspective view showing the exterior body, in a developed state, of the first embodiment of the present invention.

Next, a configuration of the exterior body 3 of the first embodiment of the present invention will be described with referent to FIGS. 1 and 2. FIG. 2 is a perspective view showing the exterior body 3 in a developed state.

As illustrated in FIG. 1, the exterior body 3 includes a plurality of wall parts 4 extending along the extending direction (longitudinal direction X) of the wire harness (electric wire) 2, and an accommodating part 5 that is formed by being surrounded by the wall parts 4 and accommodates the wire harness 2. The exterior body 3 has a cross section in which the shape in the short direction Y is a rectangular shape or a substantially rectangular shape.

As shown in FIGS. 1 and 2, the wall parts 4 is integrally formed by bending one thermoplastic resin foamed sheet. The resin type of the thermoplastic resin foamed sheet is not particularly limited as long as it is thermoplastic resin, including, for example, polyethylene resin, polypropylene resin, polycarbonate resin, polyethylene terephthalate resin, polybutylene terephthalate resin, polyamide resin, polyphenylene sulfide resin, polystyrene resin, polyvinyl chloride resin, polyvinyl acetate resin, polytetrafluoroethylene resin, acrylic resin, or the like. Moreover, from the viewpoint of further improving the balance between the bending easiness and the mechanical strength such as tensile strength, it is preferable that the thickness of the thermoplastic resin foamed sheet is 0.50 mm or more and 4.0 mm or less, and it is more preferable that the thickness is 0.8 mm or more and 2.5 mm or less.

As illustrated in FIG. 2, the wall parts 4 are formed by bending a thermoplastic resin foamed sheet at bending portions 20a to 20d. The bending portions 20a to 20d are in a shape easy for bending formation by forming an extrusion-molded portion by extrusion molding, a half-cut portion, a cut portion in a broken line shape, and the like in the flat thermoplastic resin foamed sheet.

The wall parts 4 includes a bottom wall part 41, a side wall part 42 provided continuously from an edge of the bottom wall part 41 via the bending portion 20a, a side wall part 43 provided continuously from an edge of the bottom wall part 41 via the bending portion 20b, a lower lid wall part (inner wall part) 44 provided continuously from an edge of the side wall part 42 via the bending portion 20c, and an upper lid wall part (outer wall part) 45 provided continuously from an edge of the side wall part 43 via the bending portion 20d.

As shown in FIG. 1, the bottom wall part 41 is disposed between the side wall part 42 and the side wall part 43, the side wall part 42 is erected from an edge of the bottom wall part 41 via the bending portion 20a, and the side wall part 43 is erected from an edge of the bottom wall part 41 via the bending portion 20b.

The lower lid wall part 44 and the upper lid wall part 45 overlap each other, and the overlapping portion forms a wall-surface overlapping portion. Specifically, the wall-surface overlapping portion is a portion in which the upper lid wall part 45 is superposed on the lower lid wall part 44 from above, and an upper surface 44c of the lower lid wall part 44 and a lower surface 45d of the upper lid wall part 45 are joined to each other (refer to FIG. 4 described below). Note that a joining means between the upper surface 44c of the lower lid wall part 44 and the lower surface 45d of the upper lid wall part 45 may include an adhering means such as an adhesive and an adhesive tape, a welding means such as ultrasonic welding and heat welding, a fitting means using a locking member, a rivet, and the like, a penetration fixing means using a stapler or the like, for example. With the wall-surface overlapping portion, the attaching member 61 for attaching the exterior body 3 to a vehicle is engaged.

The lower lid wall part 44 is disposed parallel or almost parallel to the bottom wall part 41 from an edge of the side wall part 42 via the bending portion 20c, and is disposed inside (accommodating part 5 side) in the overlapping portion. An edge 44a of the lower lid wall part 44 is disposed at a position away from the opposite bending portion 20d. Specifically, the edge 44a of the lower lid wall part 44 is disposed at a position not contacting the attaching member 61 engaged near the center in the short direction Y, that is, a side closer to the bending portion 20c from the center in the short direction Y.

The upper lid wall part 45 is disposed parallel or almost parallel to the bottom wall part 41 from an edge of the side wall part 43 via the bending portion 20d, and is disposed outside of the overlapping portion. The upper lid wall part 45 is disposed such that the edge 45a is almost flush with the side wall part 42 in a state of being disposed on the upper side of the lower lid wall part 44. As described below, the upper lid wall part 45 has a through-hole 47, penetrating in the thickness direction of the thermoplastic resin foamed sheet, into which the attaching member 61 is inserted, and a lower surface groove 48 and an upper surface groove 49 formed on an upper surface 45c and on a lower surface 45d facing in the thickness direction of the thermoplastic resin foamed sheet (see FIG. 2). As described below, in the first embodiment of the present invention, description will be given in the case where the lower surface groove 48 and the upper surface groove 49 are annular grooves surrounding the through-hole 47.

The accommodating part 5 is a part surrounded by the bottom wall part 41, the side wall parts 42 and 43, the lower lid wall part 44, and the upper lid wall part 45. The accommodating part 5 is formed in a cylindrical shape in which one side and another side penetrate in the longitudinal direction X by the bottom wall part 41, the side wall parts 42 and 43, the lower lid wall part 44, and the upper lid wall part 45, and can accommodate the wire harness 2.

Figure 3A:
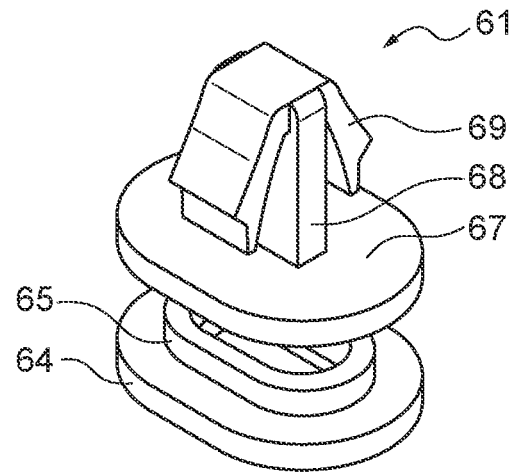
Figure 3B:
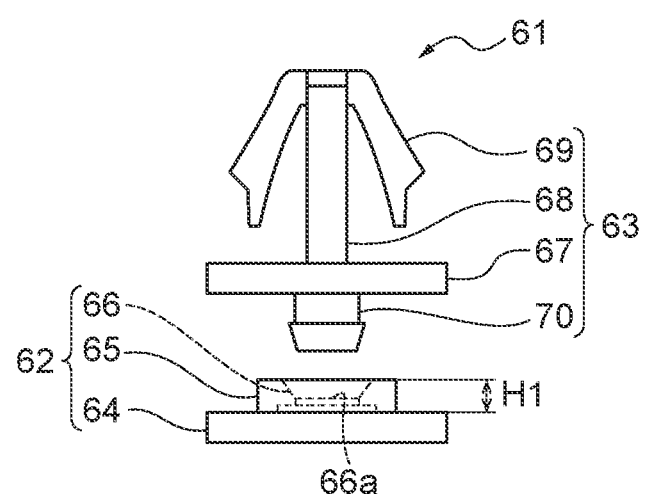

Next, an example of an attaching member to be engaged with the exterior body 3 will be described with reference to FIG. 3A and FIG. 3B. FIG. 3A and FIG. 3B is a view showing an example of an attaching member for attaching the exterior body 3 to a vehicle body, in which FIG. 3A is a perspective view of the attaching member 61, and FIG. 3B is a side view of the attaching member when viewed from the longitudinal direction X side. Note that the attaching member 61 shown in FIG. 3A and FIG. 3B is an example of an attaching member to be engaged with the exterior body 3 of the first embodiment of the present invention. An attaching member to be engaged with the exterior body 3 may be another similar attaching member.

As shown in FIGS. 3A and 3B, the attaching member 61 includes an exterior body-side engagement portion 62 to be attached to the exterior body 3 and a vehicle body-side engagement portion 63 to be attached to a vehicle body.

The exterior body-side engagement portion 62 has a bottom part 64 disposed on the lower surface 45d of the upper lid wall part 45, an erecting part 65 that is disposed inside the through-hole 47 of the upper lid wall part 45, is formed to be narrower than the width of the bottom part 64 in the short direction Y (see FIG. 1), and erects upward from the bottom part 64, and an insertion hole 66 dented from above to below of the erecting part 65 so as to allow an insertion part 70, described below, to be inserted.

The vehicle body-side engagement portion 63 has a base part 67 that is formed to have a width that is the same or almost the same as that of the bottom part 64 and is disposed on the upper surface 45c of the upper lid wall part 45, the bottom part 64 in the short direction Y (see FIG. 1), a pillar 68 that is formed to be narrower than the widths of the erecting part 65 and the base part 67 and extends upward from the base part 67, a wing part 69 formed to project to both sides from the top end of the pillar 68, and the insertion part 70 that extends downward from the base part 67. The wing part 69 is formed to be able to be inserted into an attachment hole (not shown) of the vehicle body, and also to be elastically deformable to be able to be locked after insertion. When the insertion part 70 is inserted in the insertion hole 66, the tip end portion of the insertion part 70 is elastically deformed inward, and when it goes over the locking part 66a of the insertion hole 66, it is elastically restored and contacts the periphery of the locking part 66a to be locked. When the insertion part 70 is locked by the locking part 66a, the upper end of the erecting part 65 contacts the lower surface of the base part 67, and the exterior body-side engagement portion 62 and the vehicle body-side engagement portion 63 are locked.

Figure 4:
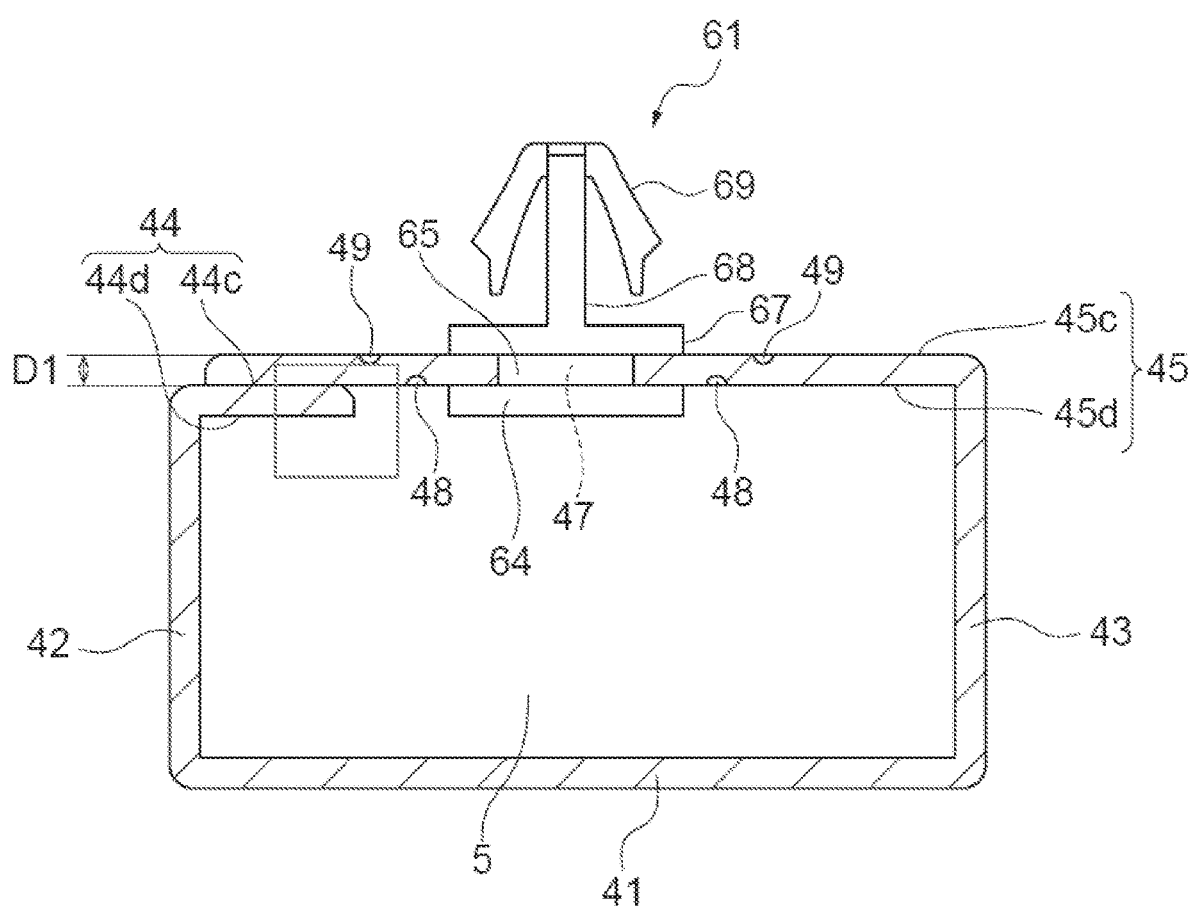
FIG. 4 A cross-sectional view of the exterior body in a cross section taken along line A-A shown in FIG. 1.

Next, with reference to FIGS. 2 and 4, shapes of the through-hole 47, the lower surface groove 48, and the upper surface groove 49 formed on the upper lid wall part 45 will be described. FIG. 4 is a cross-sectional view of the exterior body 3 in a cross section taken along line A-A shown in FIG. 1.

As shown in FIGS. 2 and 4, the through-hole 47 is a hole penetrating from the upper surface 45c to the lower surface 45d that is on the accommodating part 5 side, in the upper lid wall part 45. The through-hole 47 is formed such that the width in the short direction Y (see FIG. 1) is slightly larger than the width in the short direction Y of the erecting part 65 so as to allow the erecting part 65 of the attaching member 61 to be inserted and positioned inside. As shown in FIG. 4, it is preferable that a depth D1 of the through-hole 47 is the same or almost the same as a height H1 of the erecting part 65 (see FIG. 3B) (D1=H1), from the viewpoint of preventing the erecting part 65 from protruding from the lower surface 45d of the upper lid wall part 45. That is, the thermoplastic resin foamed sheet forming a plurality of wall parts 4 has a thickness that is the same as or a thickness almost the same as the height H1 of the erecting part 65 to be inserted into the through-hole 47, and it is preferable to form the through-hole 47 using the thermoplastic resin foamed sheet.

As shown in FIGS. 2 and 4, the lower surface groove 48 and the upper surface groove 49 are disposed at positions different from each other in the thickness direction of the thermoplastic resin foamed sheet. The lower surface groove 48 and the upper surface groove 49 are extrusion-molded portions formed such that the thermoplastic resin foamed sheet is extrusion-molded to have groove shapes where the thickness of the thermoplastic resin foamed sheet is reduced.

The lower surface groove 48 and the upper surface groove 49 will be described specifically. The present inventor manufactured several pieces of thermoplastic resin foamed sheets with no groove (comparative example) and several pieces of thermoplastic resin foamed sheets with grooves (Example 1, Example 2, Example 3, Example 4), performed destructive testing to give impact on those thermoplastic resin foamed sheets, and evaluated the destructive state by visually recognizing presence or absence of destruction.

Among the thermoplastic resin foamed sheets in which grooves are formed, in Example 1 and Example 2, a groove of 0.7 mm width is formed by using a blade having a thickness of 0.7 mm for forming the groove, and in Example 3 and Example 4, a groove of 0.9 mm width is formed by using a blade having a thickness of 0.9 mm for forming the groove. Moreover, in Example 1 and Example 3, the depth of the groove is 60% of the thickness of the thermoplastic resin foamed sheet, and in Example 2 and Example 4, the depth of the groove is 75% of the thickness of the thermoplastic resin foamed sheet. Then, with respect to Example 1, Example 2, Example 3, and Example 4, destructive testing was performed to give impact on the groove forming surfaces on which grooves were formed and the rear surfaces on which no groove was formed. Table 1 shows results of visually recognizing presence or absence of destruction.

TABLE 1

| ITEM | | COMPARATIVE EXAMPLE1 | EXAMPLE1 | EXAMPLE2 | EXAMPLE3 | EXAMPLE4 |
|---|---|---|---|---|---|---|
| BLADE THICKNESS (mm) | | — | 0.7 | | 0.9 | |
| GROOVE DEPTH (%) | | — | 60 | 75 | 60 | 75 |
| IMPACT DESTRUCTION | GROOVE FORMED SURFACE | — | Δ | ○ | ○ | ◎ |
| | REAR SURFACE | X | Δ | ○ | Δ | ○ |

X: ALL DESTRUCTED
Δ: SOME DESTRUCTED
○: ALMOST ALL NOT DESTRUCTED
◎ ALL NOT DESTRUCTED

As shown in Table 1, in the thermoplastic resin foamed sheets of the comparative example, destruction was recognized in all of the manufactured thermoplastic resin foamed sheets. On the other hand, in the thermoplastic resin foamed sheets of Example 1, destruction was recognized in some of the manufactured thermoplastic resin foamed sheets. However, in the thermoplastic resin foamed sheets of Example 2, destruction was not recognized in almost all of the manufactured thermoplastic resin foamed sheets. Further, in the thermoplastic resin foamed sheets of Example 3, destruction was not recognized in almost all of the thermoplastic resin foamed sheets when impact was given to the surfaces on which grooves were formed, but destruction was recognized in some of the thermoplastic resin foamed sheets when impact was given to the rear surfaces. In the thermoplastic resin foamed sheets of Example 4, destruction was not recognized in all of the manufactured thermoplastic resin foamed sheets when impact was given on the surfaces on which grooves were formed, but destruction was not recognized in almost all of the manufactured thermoplastic resin foamed sheets when impact was given to the rear surfaces.

In view of the above, in the thermoplastic resin foamed sheets of Examples 1 to 4, the number of destructed thermoplastic resin foamed sheets was small compared with the thermoplastic resin foamed sheets of the comparative example. That is, it can be evaluated that the thermoplastic resin foamed sheets on which grooves are formed of Examples 1 to 4 are superior as the exterior body 3 because they are displaced when impact is applied so that the stress is mitigated. Therefore, in the first embodiment of the present invention, the lower surface groove 48 and the upper surface groove 49 are formed on the exterior body 3. Further, from the viewpoint of preventing destruction of the thermoplastic resin foamed sheet, in the grooves of the lower surface groove 48 and the upper surface groove 49, it is preferable that the width of the groove is 0.7 mm or more and 0.9 mm or less and that the depth of the groove is 60% or more and 80% or less of the thickness of the thermoplastic resin foamed sheet.

The lower surface groove 48 and the upper surface groove 49 are high-density portions in which the density of the thermoplastic resin foamed sheet is higher than that of the wall parts 4 except for the bending portions 20a to 20d. The density of the thermoplastic resin foamed sheet in the lower surface groove 48 and the upper surface groove 49 may be the same or almost the same as the density of the bending portions 20a to 20d. Moreover, in the lower surface groove 48 and the upper surface groove 49, from the viewpoint of preventing damages in the thermoplastic resin foamed sheet, it is preferable that the density is 400 Kg/m³ or more and 1200 Kg/m³ or less, and it is more preferable that the density is 500 Kg/m³ or more and 1200 Kg/m³ or less, although the density is not particularly limited as long as it is a higher value than that of the wall parts 4 except for the bending portions 20a to 20d.

The lower surface groove 48 is an elliptic and annular groove surrounding the through-hole 47, and having a shape dented from the lower surface 45d toward the upper surface 45c of the upper lid wall part 45. As shown in FIG. 4, the lower surface groove 48 is formed in the upper lid wall part 45 except for the wall-surface overlapping portion in which the lower lid wall part 44 and the upper lid wall part 45 overlap each other. Specifically, the lower surface groove 48 is disposed around the bottom part 64 of the attaching member 61 disposed on the lower surface 45d of the upper lid wall part 45, and is disposed inside the upper surface groove 49.

The upper surface groove 49 is an elliptic and annular groove disposed outside the lower surface groove 48, and having a shape dented from the upper surface 45c toward the lower surface 45d of the upper lid wall part 45. As shown in FIG. 4, the upper surface groove 49 is formed in the lower lid wall part 44 except for the wall-surface overlapping portion in which the lower lid wall part 44 and the upper lid wall part 45 overlap each other. Specifically, the upper surface groove 49 is disposed around the base part 67 of the attaching member 61 disposed on the upper surface 45c of the upper lid wall part 45, and is disposed outside the lower surface groove 48. That is, in a cross section as viewed in the short direction Y of the exterior body 3, the upper surface groove 49 is disposed on the side wall parts 42 and 43 side from the lower surface groove 48.

Note that in the first embodiment of the present invention, description has been given on the case where the lower surface groove 48 and the upper surface groove 49 are annular grooves surrounding the through-hole 47. However, they may be in another shape. For example, the lower surface groove 48 and the upper surface groove 49 may be linear grooves positioned to face each other over the through-hole 47. Further, the linear groove may extend in the longitudinal direction X or extend in the short direction. Furthermore, the linear groove may be in a straight-line shape or in a curved-line shape.

Next, a method of forming the exterior body 3 described above and a method of forming the exterior-covered wire harness 1 by attaching the wire harness 2 to the exterior body 3 will be described.

In the method of forming the exterior body 3, first, stamping is performed to stamp out a portion corresponding to the exterior body 3 from a thermoplastic resin foamed sheet serving as a base material for forming the exterior body 3. As stamping, for example, stamping using a Thomson blade mold can be considered from the viewpoint of cost reduction and easy processing.

After stamping out the portion corresponding to the exterior body 3, stamping is performed to stamp out the portion corresponding to the through-hole 47 at a position where the attaching member 61 of the upper lid wall part 45 is to be attached.

Further, in the stamped-out portion corresponding to the exterior body 3, extrusion molding is performed on the portions corresponding to the bending portions 20a to 20d. Through the extrusion molding, the bending portions 20a to 20d are formed, and good bending property is given to the bending portions 20a to 20d.

Furthermore, in the stamped-out portion corresponding to the exterior body 3, extrusion molding is performed on the portions corresponding to the upper surface groove 49 and the lower surface groove 48. Through the extrusion molding, the upper surface groove 49 and the lower surface groove 48 are formed.

In the method of attaching the exterior body 3, formed as described above, to the wire harness 2, first, the exterior body 3 is bent at the bending portions 20a and 20b such that the side wall parts 42 and 43 become almost perpendicular to the bottom wall part 41. When the bending portions 20a and 20b are bent, the space between the end portion sides of the side wall parts 42 and 43 opens upward along the longitudinal direction X.

After the bending portions 20a and 20b are bent, the wire harness 2 is placed on the bottom wall part 41, and the bending portion 20c is bent such that the lower lid wall part 44 becomes almost parallel to the bottom wall part 41. Thereafter, the bending portion 20d is bent such that the upper lid wall part 45 becomes almost parallel to the bottom wall part 41. When the upper lid wall part 45 is bent at the bending portion 20d, the lower lid wall part 44 and the upper lid wall part 45 overlap each other to form a wall-surface overlapping portion. When the upper lid wall part 45 is bent at the bending portion 20d, the opening between the side wall part 42 and the side wall part 43 is closed to form the accommodating part 5, and the wire harness 2 is accommodated in the accommodating part 5 in an inserted state. Further, in the wall-surface overlapping portion, the lower lid wall part 44 and the upper lid wall part 45 are joined to each other, whereby a state where the opening between the side wall part 42 and the side wall part 43 is closed is fixed, so that the exterior body 3 is mounted on the outer periphery of the wire harness 2.

After the exterior body 3 is mounted on the outer periphery of the wire harness 2, the erecting part 65 of the attaching member 61 is inserted upward into the through-hole 47 of the upper lid wall part 45 from the lower surface 45d side of the upper lid wall part 45, and the insertion part 70 of the attaching member 61 is inserted downward into the through-hole 47 from the upper surface 45c side of the upper lid wall part 45. Then, when the insertion part 70 of the attaching member 61 is inserted into the insertion hole 66 of the attaching member 61 and is locked, the upper end of the erecting part 65 contacts the lower surface of the base part 67, and the upper lid wall part 45 is interposed between the bottom part 64 and the base part 67. Moreover, since the erecting part 65 is inserted into the through-hole 47, the attaching member 61 is engaged with the exterior body 3, whereby the exterior body 3 can be attached to a vehicle body.

Note that the exterior body 3 may be mounted on the outer periphery of a fixing tape for fixing a plurality of electric wires forming the wire harness 2 for preventing the electric wires from falling apart, or may be mounted on the outer peripheries of a plurality of electric wires not using a fixing tape. Alternatively, the exterior body 3 may be mounted on the outer periphery of one electric wire.

As described above, according to the exterior body 3 and the exterior-covered wire harness 1 of the first embodiment of the present invention, the upper lid wall part 45 has the through-hole 47 into which the attaching member 61 is to be inserted, and the upper surface groove 49 and the lower surface groove 48 in which the thickness of the thermoplastic resin foamed sheet is reduced are formed around the through-hole 47. Since the upper surface groove 49 and the lower surface groove 48 are formed, when a stress is caused around the through-hole 47 in which the attaching member 61 is engaged with the upper lid wall part 45, the upper lid wall part 45 around the through-hole 47 is displaced so as to mitigate the stress. Therefore, even in the case where it is attached to a vehicle or the like in which vibration is generated, it is possible to prevent the exterior body 3 from being damaged. Although it is possible to mitigate the stress by either one of the lower surface groove 48 or the upper surface groove 49, by forming two grooves, it is possible to mitigate the stress much more compared with the case where only one groove is formed.

Moreover, by displacing the positions of the lower surface groove 48 and the upper surface groove 49 in the surface direction of the resin foamed sheet, it is possible to prevent the thickness of the resin foamed sheet from being extremely reduced.

Moreover, in the upper surface groove 49 and the lower surface groove 48, the density of the thermoplastic resin foamed sheet is higher than that of the wall parts 4 except for the bending portions 20a to 20d. Therefore, it is possible to prevent the strength of the upper lid wall part 45 from being lowered due to formation of grooves, so as to be able to achieve excellent durability even when it is attached to a vehicle or the like in which vibration is generated.

Figure 5:
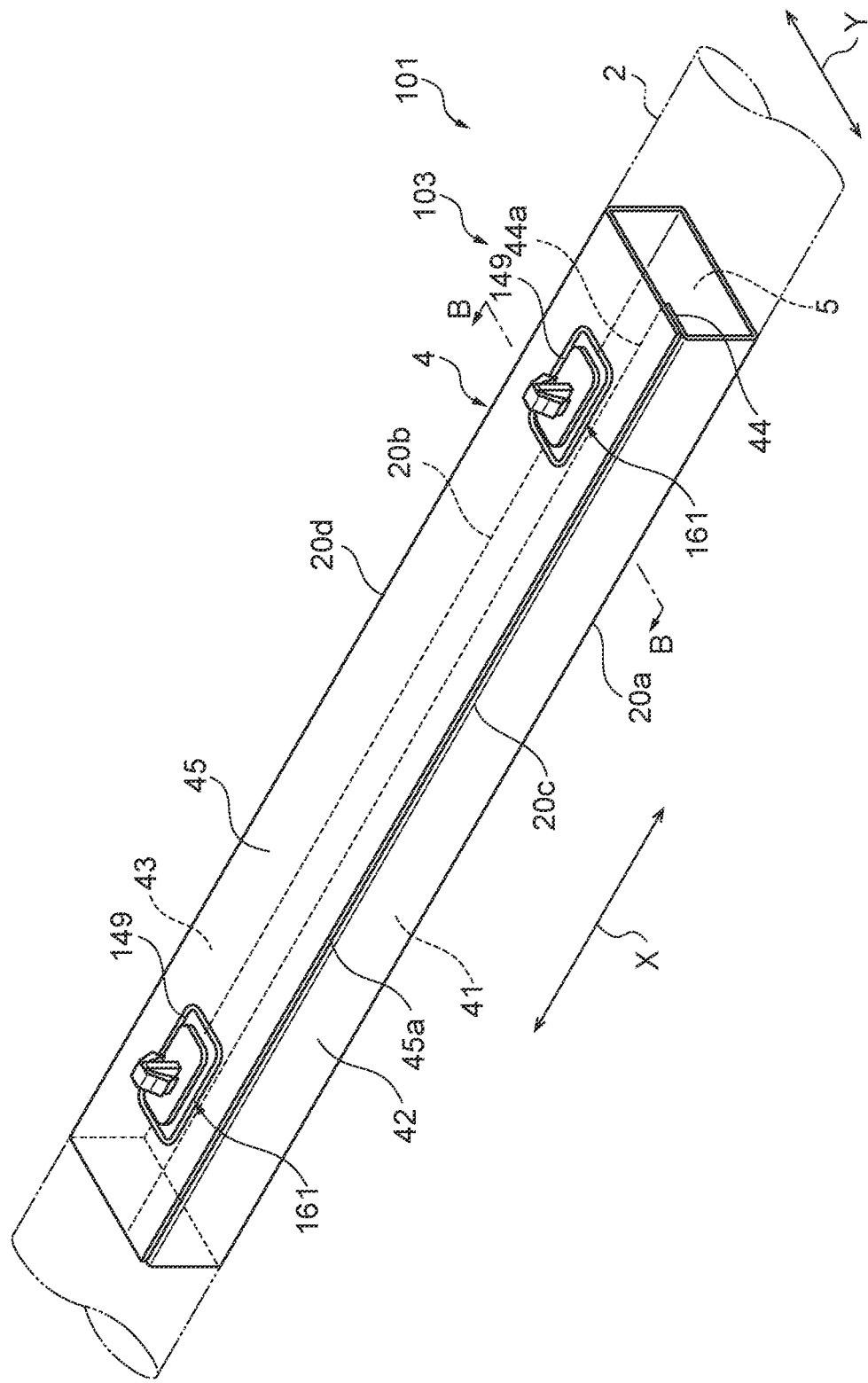
FIG. 5 A perspective view showing an exterior body and an exterior-covered wire harness of a second embodiment of the present invention.

Next, a second embodiment of the present invention will be described with reference to FIGS. 5 to 8. First, a configuration of an exterior-covered wire harness according to the second embodiment of the present invention will be described with reference to FIG. 5. FIG. 5 is a perspective view showing an exterior body 103 and an exterior-covered wire harness 101 of the second embodiment of the present invention.

Note that the exterior body 103 and the exterior-covered wire harness 101 of the second embodiment of the present invention are ones in which the improvements are made to the through-hole 47, the lower surface groove 48, and the upper surface groove 49 in the upper lid wall part 45 of the exterior body 3 and the exterior-covered wire harness 1 of the first embodiment of the present invention. The configurations of the other parts are the same. Therefore, hereinafter, configurations that are same as or similar to those of the exterior body 3 and the exterior-covered wire harness 1 of the first embodiment of the present invention are denoted by the same reference numerals as those of the exterior body 3 and the exterior-covered wire harness 1 and the description thereof is omitted. Only different configurations will be described.

As shown in FIG. 5, the exterior-covered wire harness 101 of the second embodiment of the present invention includes a wire harness 2 in which a plurality of electric wires are bundled, and a wire exterior body (hereinafter, also referred to as "exterior body") 103 to be mounted on the outer periphery of the wire harness 2. In the exterior-covered wire harness 101 of the second embodiment of the present invention, a plurality of (two, in the second embodiment of the present invention) attaching members 61 for attaching to a vehicle (not shown) are engaged near the center in the short direction Y.

Figure 6:
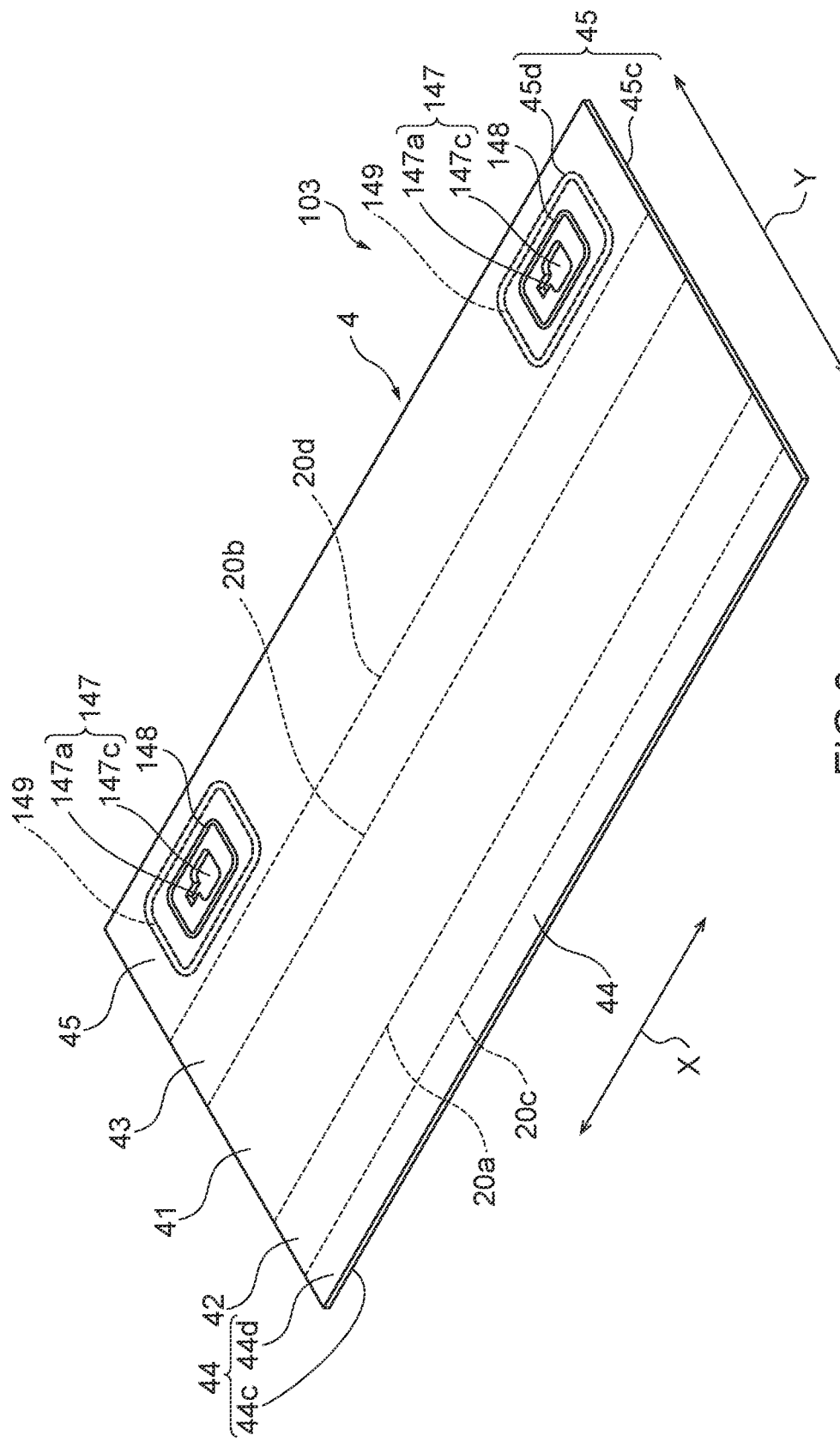
FIG. 6 A perspective view showing the exterior body, in a developed state, of the second embodiment of the present invention.

Next, a configuration of the exterior body 103 of the second embodiment of the present invention will be described with referent to FIG. 6. FIG. 6 is a perspective view showing the exterior body 103 in a developed state.

As shown in FIG. 6, the exterior body 103 includes a plurality of wall parts 4 extending along the extending direction of the wire harness 2 (longitudinal direction X), namely a bottom wall part 41, side wall parts 42 and 43, a lower lid wall part (inner wall part) 44, and an upper lid wall part (outer wall part) 45.

The upper lid wall part 45 has a through-hole 147 to which an attaching member 161 is locked, and a lower surface groove 148 and an upper surface groove 149 formed on an upper surface 45c and on a lower surface 45d facing in the thickness direction of the thermoplastic resin foamed sheet. As described below, in the second embodiment of the present invention, description will be given on the case where the lower surface groove 148 and the upper surface groove 149 are annular grooves surrounding the through-hole 47.

Figure 7A:
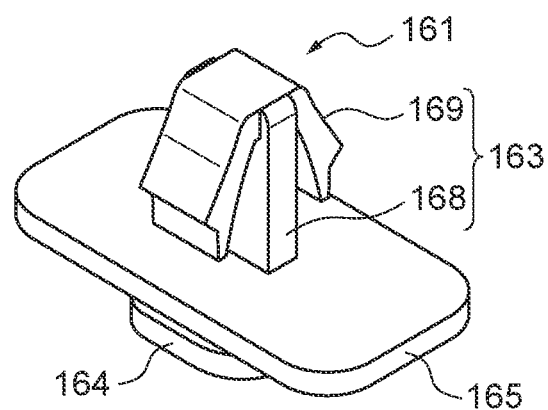
Figure 7B:
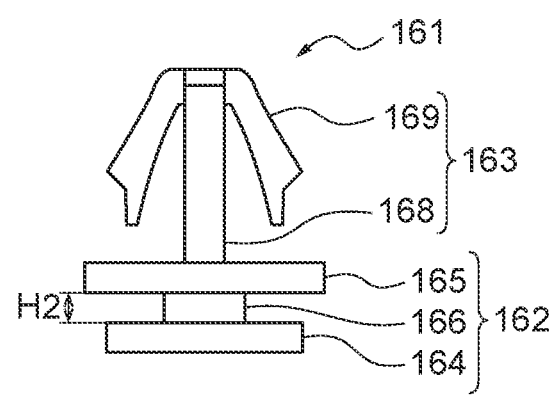

Next, an example of an attaching member to be engaged with the exterior body 103 will be described with reference to FIG. 7A and FIG. 7B. FIG. 7A and FIG. 7B shows an example of an attaching member for attaching the exterior body 103 to a vehicle body, in which FIG. 7A is a perspective view of the attaching member 161, and FIG. 7B is a side view of the attaching member 161 when viewed from the longitudinal direction X side. Note that the attaching member 161 shown in FIG. 7A and FIG. 7B is an example of an attaching member to be engaged with the exterior body 103 of the second embodiment of the present invention. The attaching member to be engaged with the exterior body 103 may be another similar attaching member.

As shown in FIGS. 7A and 7B, the attaching member 161 includes an exterior body-side locking part 162 to be attached to the exterior body 3 and a vehicle body-side engagement part 163 to be attached to a vehicle body.

The exterior body-side locking part 162 includes an inner-side fixing part 164 disposed on the lower surface 45d of the upper lid wall part 45, an outer-side fixing part 165 formed to be wider than the width of the inner-side fixing part 164 in the short direction Y (see FIG. 5) and disposed on the upper surface 45c of the upper lid wall part 45, and a connecting part 166 that is formed to be narrower than the widths of the inner-side fixing part 164 and the outer-side fixing part 165 in the short direction Y (see FIG. 5) and connects almost central portions of the inner-side fixing part 164 and the outer-side fixing part 165.

The vehicle-side engagement part 163 includes a pillar 168 extending upward from the outer-side fixing part 165, and a wing part 169 formed to project in both directions from the upper end of the pillar 168. The wing part 169 is formed to be able to be inserted into an attachment hole (not shown) of a vehicle body, and also to be elastically deformable so as to be able to be locked after being inserted.

Figure 8:
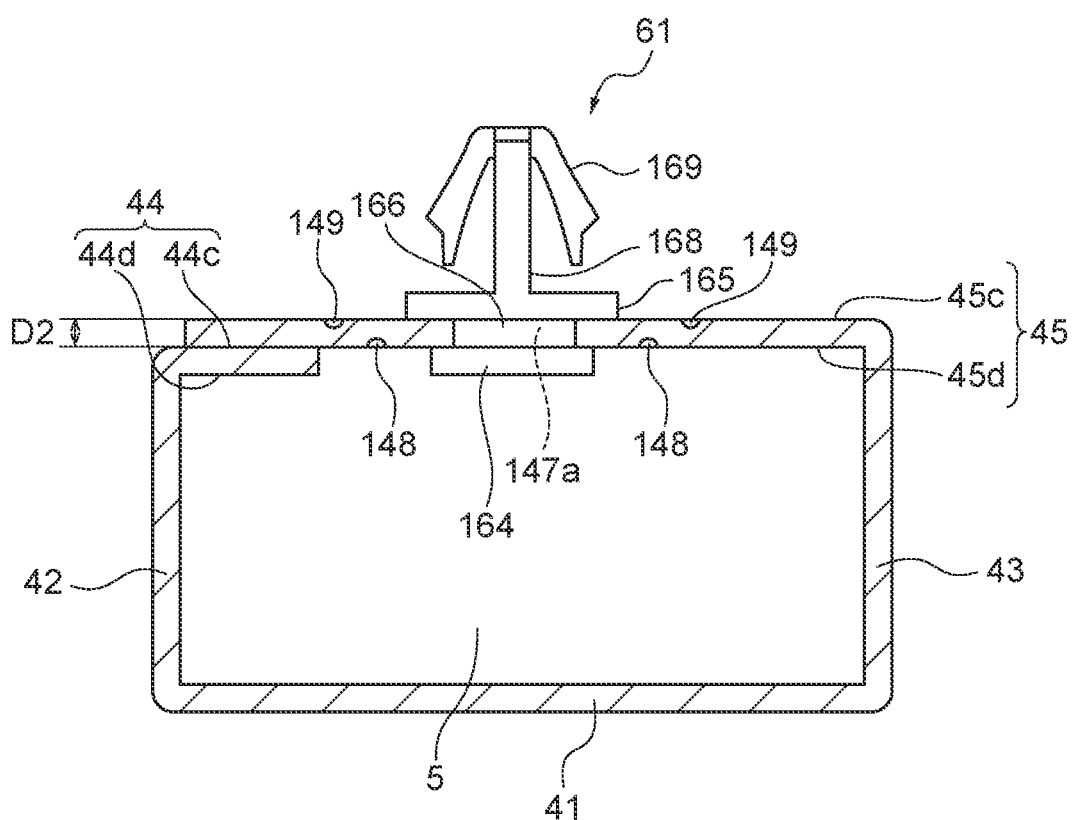
FIG. 8 A cross-sectional view of the exterior body in a cross section taken along line B-B shown in FIG. 5.

Next, with reference to FIGS. 6 and 8, shapes of the through-hole 147, the lower surface groove 148, and the upper surface groove 149 formed on the upper lid wall part 45 will be described. FIG. 8 is a cross-sectional view of the exterior body 103 in a cross section taken along line B-B shown in FIG. 5.

As shown in FIGS. 6 and 8, the through-hole 147 is a hole penetrating from the upper surface 45c to the lower surface 45d that is on the accommodating part 5 side in the upper lid wall part 145, and has a T shape when viewed from the upper surface. The through-hole 147 has a narrow portion 147a into which the connecting part 166 of the attaching member 161 is to be inserted, and a wide portion 147c that is wider than the narrow portion 147a.

As shown in FIG. 8, the narrow portion 147a is formed such that the width in the short direction Y (see FIG. 5) is slightly larger than the width in the short direction Y of the connecting part 166 so as to allow the connecting part 166 of the attaching member 161 to be inserted and positioned inside. It is preferable that a depth D2 of the narrow portion 147a is the same or almost the same as a height H2 of the connecting part 166 (see FIG. 7B, FIG. 8) (D2=H2), from the viewpoint of preventing the connecting part 166 from protruding from the lower surface 44d of the upper lid wall part 45.

The wide portion 147c is formed so as to allow the inner-side fixing part 164 and the connecting part 166 of the attaching member 161 to be inserted and allow the inserted connecting part 166 to move to the narrow portion 147a. That is, the wide portion 147c is formed such that the width thereof in the short direction Y (see FIG. 5) is larger than the widths of the inner-side fixing part 164 and the connecting part 166 in the short direction Y.

As shown in FIGS. 6 and 8, the lower surface groove 148 and the upper surface groove 149 are disposed at positions different from each other in the thickness direction of the thermoplastic resin foamed sheet.

The lower surface groove 148 is a rectangular and annular groove surrounding the through-hole 47 and has a shape dented from the lower surface 45d toward the upper surface 45c of the upper lid wall part 45. As shown in FIG. 8, the lower surface groove 148 is formed in the upper lid wall part 45 except for the wall-surface overlapping portion in which the lower lid wall part 44 and the upper lid wall part 45 overlap each other. Specifically, the lower surface groove 148 is disposed around the bottom part 64 of the attaching member 61 disposed on the lower surface 45d of the upper lid wall part 45, and is disposed inside the upper surface groove 149.

The upper surface groove 149 is a rectangular and annular groove disposed outside the upper surface groove 149 and has a shape dented from the upper surface 45c toward the lower surface 45d of the upper lid wall part 45. As shown in FIG. 8, the upper surface groove 149 is formed on the lower lid wall part 44 except for the wall-surface overlapping portion in which the lower lid wall part 44 and the upper lid wall part 45 overlap each other. Specifically, the upper surface groove 149 is disposed around the base part 67 of the attaching member 61 disposed on the upper surface 45c of the upper lid wall part 45, and is disposed outside the lower surface groove 148. That is, in a cross section as viewed in the short direction Y of the exterior body 3, the upper surface groove 149 is disposed on the side wall parts 42 and 43 side from the lower surface groove 148.

Note that in the second embodiment of the present invention, description has been given on the case where the lower surface groove 148 and the upper surface groove 149 are annular grooves surrounding the through-hole 147, but they may be in another shape. For example, the lower surface groove 148 and the upper surface groove 149 may be linear grooves positioned to face each other over the through-hole 147. The linear groove may extend in the longitudinal direction X or extend in the short direction Y. Moreover, the linear groove may be in a straight-line shape or in a curved-line shape. Furthermore, the lower surface groove 148 and the upper surface groove 419 may be T-shaped grooves along the shape of the through-hole 147 in a T shape.

Next, a method of forming an exterior-covered wire harness 1 by mounting the wire harness 2 on the exterior body 103 will be described.

In the method of mounting the exterior body 103 formed as described above on the wire harness 2, first, the exterior body 103 is bent at bending portions 20a and 20b such that the side wall parts 42 and 43 become almost perpendicular to the bottom wall part 41, the wire harness 2 is placed on the bottom wall part 41, and the bending portion 20c is bent such that the lower lid wall part 44 becomes almost parallel to the bottom wall part 41.

Thereafter, the bending portion 20d is bent such that the upper lid wall part 45 becomes almost parallel to the bottom wall part 41, and in the wall-surface overlapping portion in which the lower lid wall part 44 and the upper lid wall part 45 overlap each other, the lower lid wall part 44 and the upper lid wall part 45 are joined, whereby the exterior body 103 is mounted on the outer periphery of the wire harness 2.

After the exterior body 103 is mounted on the outer periphery of the wire harness 2, the inner-side fixing part 164 of the attaching member 161 is inserted into the wide portion 147c of the through-hole 147. Then, in a state where the upper lid wall part 45 is positioned between the inner-side fixing part 164 and the outer-side fixing part 165, the connecting part 166 of the attaching member 161 is slid from the wide portion 147c to the narrow portion 147a. When the connecting part 166 is slid to the narrow portion 147a, the upper lid wall part 45 is interposed between the inner-side fixing part 164 and the outer-side fixing part 165. Further, when the connecting part 166 is inserted into the narrow portion 147a of the through-hole 147, the attaching member 161 is engaged with the exterior body 103, whereby the exterior body 103 can be attached to a vehicle body.

The exterior body 103 and the exterior-covered wire harness 2 of the second embodiment of the present invention can achieve an effect similar to that of the exterior body 3 and the exterior-covered wire harness 1 of the first embodiment of the present invention.

While preferred embodiments of the present invention have been described above, the present invention is not limited to the exterior bodies 3 and 103 and the exterior-covered wire harness 1 according to the embodiments described above, and includes every aspect included in the spirit of the present invention and the scope of the claims. Also, respective configurations may be selectively combined as appropriate so as to achieve at least part of the object and effect described above. For example, shapes, materials, arrangement, size, and the like of the respective constituent elements in the embodiments described above can be changed as appropriate according to specific used aspects of the present invention. The configurations of the respective parts can be replaced with any configurations having similar functions.

While description has been given on the case where the lower surface groove 48, 148, in the embodiments of the present invention described above, is an annular groove surrounding the through-hole 47, 147, it may be formed as part of the periphery of the through-hole 47, 147. Further, while, in the embodiments of the present invention described above, description has been given on the case where the upper surface groove 49, 149 is an annular groove surrounding the lower surface groove 48, 148, it may be formed as part of the periphery of the lower surface groove 48, 148.

Further, while description has been given on the case where the upper surface groove 49, 149 is disposed outside the lower surface groove 48, 148, the lower surface groove 48, 148 may be disposed outside the upper surface groove 49, 149.

Further, while description has been given on the case where the lower surface groove 48, 148 and the upper surface groove 49, 149 are formed on the upper lid wall part 45 in the embodiments of the present invention described above, only one of the lower surface groove 48, 148 and the upper surface groove 49, 149 may be formed.

Next, an exterior-covered wire harness according to an exemplary embodiment of the present invention will be described with reference to FIGS. 9 and 10. An exterior-covered wire harness 300 according to an exemplary embodiment of the present invention includes a wire harness 310 in which a plurality of electric wires are bundled, and an exterior body (wire exterior body) 201 to be mounted on the outer periphery of the wire harness 310. The wire exterior body 201 includes a plurality of wall parts 210 extending along the extending direction (longitudinal direction x in FIG. 9) of the wire harness 310, and an accommodating part 213 that is formed by being surrounded by the wall parts 210 and accommodates the wire harness 310. In the exterior-covered wire harness 300, corresponding to the fact that the wire harness 310 is routed by being bent along the extending direction (longitudinal direction x in FIG. 9), the wire exterior body 201 has a bent portion 230 formed along the extending direction of the wire harness 310. Note that in FIG. 9, while the wire harness 310 is shown in one columnar shape, the wire harness 310 is formed of a plurality of electric wires that are bundled. Note that in the present specification, the longitudinal direction x is a direction along the extension of the wire harness 310, that is, a direction along the extension of the wire exterior body 201, and in the wire exterior body 201 in which the bent portion 230 is formed, it is a direction along the bent of the bent portion 230.

Next, the wire exterior body 201 according to an exemplary embodiment of the present invention will be described. As shown in FIG. 9, the wire exterior body 201 includes a plurality of wall parts 210 extending along the extending direction (longitudinal direction x in FIG. 9) of the wire harness 310. Each of the wall parts 210 has the bent portion 230 in the longitudinal direction x. The space formed by being surrounded by the wall parts 210 forms an accommodating part 213 in which the wire harness 310 is to be accommodated. The wire harness 310 is protected from the external environment by the wire exterior body 201.

The wall parts 210 of the wire exterior body 201 are integrally formed of one resin sheet (for example, thermoplastic resin foamed sheet) that is bent. The resin sheet is bent at bending portions 220a to 220d to form the wall parts 210. The wall parts 210 include a bottom wall part 221, a side wall part 222 provided continuously from an edge of the bottom wall part 221 via the bending portion 220a, a side wall part 223 provided continuously from an edge of the bottom wall part 221 via the bending portion 220b, an inner lid wall part 224 provided continuously from the tip of the side wall part 222 via the bending portion 220c, and an outer lid wall part 225 provided continuously from the tip of the side wall part 223 via the bending portion 220d. The outer lid wall part 225 is provided so as to be superposed on the inner lid wall part 224. The bottom wall part 221 extends integrally from one end portion 232 to another end portion 233 of the wire exterior body 201 in the longitudinal direction x. That is, the bottom wall part 221 is provided over the bent portion 230 in the longitudinal direction x of the wire exterior body 201.

Figure 9:
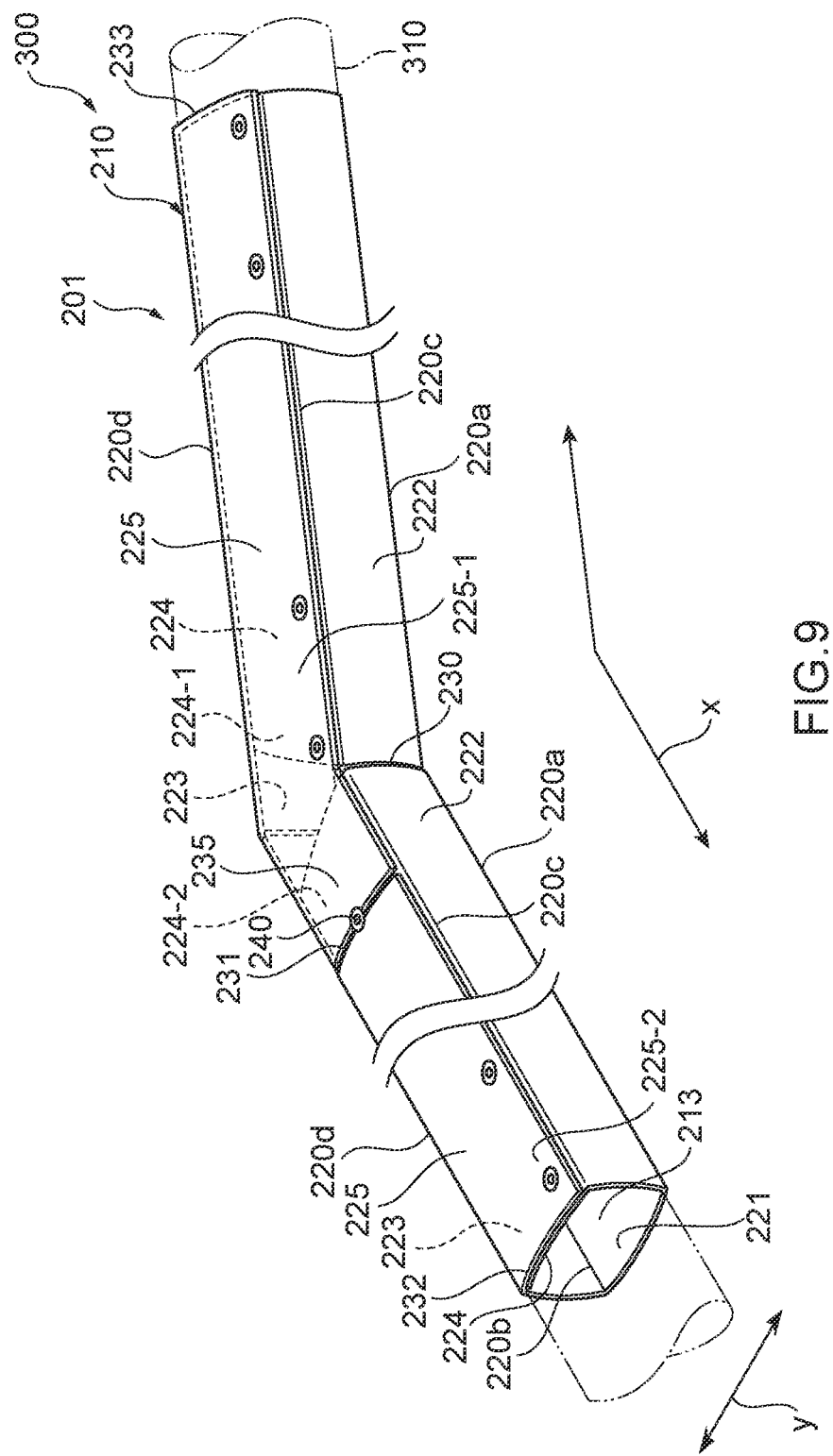
FIG. 9 A perspective view showing an exterior body and an exterior-covered wire harness of an exemplary embodiment of the present invention.

As shown in FIG. 9, the accommodating part 213 includes the bent portion 230 with a predetermined bent angle, corresponding to the wire harness 310 that is routed while being bent in the extending direction. The accommodating part 213 is a part surrounded by the bottom wall part 221, the side wall parts 222 and 223, the inner lid wall part 224, and the outer lid wall part 225. The accommodating part 213 is also formed in a cylindrical shape in which one side and another side facing the one side penetrate in the longitudinal direction x, by the bottom wall part 221, the side wall part 222 and 223, the inner lid wall part 224, and the outer lid wall part 225. A cross-sectional shape in the short direction y of the accommodating part 213 is an almost rectangular shape. Further, the cross-sectional area in the short direction y of the accommodating part 213 is almost the same anywhere in the longitudinal direction x. The wire exterior body 201 includes two linear portions via the bent portion 230 in the longitudinal direction x.

In the outer lid wall part 225 facing the bottom wall part 221, a boundary portion 231 is formed by being divided between one end portion 232 and the bent portion 230 of the wire exterior body 201 in the longitudinal direction x. That is, the outer lid wall part 225 is separated into a first portion 225-1 and a second portion 225-2 with the boundary portion 231 being the boundary. Further, the first portion 225-1 and the second portion 225-2 are adjacent to each other with the boundary portion 231 being the boundary. The first portion 225-1 is a wall member provided over the bent portion 230 along the longitudinal direction x of the wire exterior body 201. In the first portion 225-1, one tip end portion thereof in the longitudinal direction x is positioned between the one end portion 232 in the longitudinal direction x and the bent portion 230 of the wire exterior body 201. Accordingly, the tip end portion of the first portion 225-1 is positioned at the boundary portion 231. The first portion 225-1 extends from another end portion 233 facing the one end portion 232 in the longitudinal direction x of the wire exterior body 201 up to the boundary portion 231.

On the other hand, the second portion 225-2 of the outer lid wall part 225 extends from the one end portion 232 up to the boundary portion 231.

In the wire exterior body 201, bending of the bent portion 230 is formed at a predetermined angle toward a direction orthogonal to the longitudinal direction x in the linear portion of the outer lid wall part 225 and a width direction of the outer lid wall part 225 (that is, the short direction y in FIG. 9). From the above description, even in the bottom wall part 221 disposed to face the outer lid wall part 225, bending of the bent portion 230 is formed at a predetermined angle toward the short direction y. That is, the bent direction of the bent portion 230 with respect to the linear portion of the wire exterior body 201 is made toward the short direction y of the wall parts 210.

Figure 10:
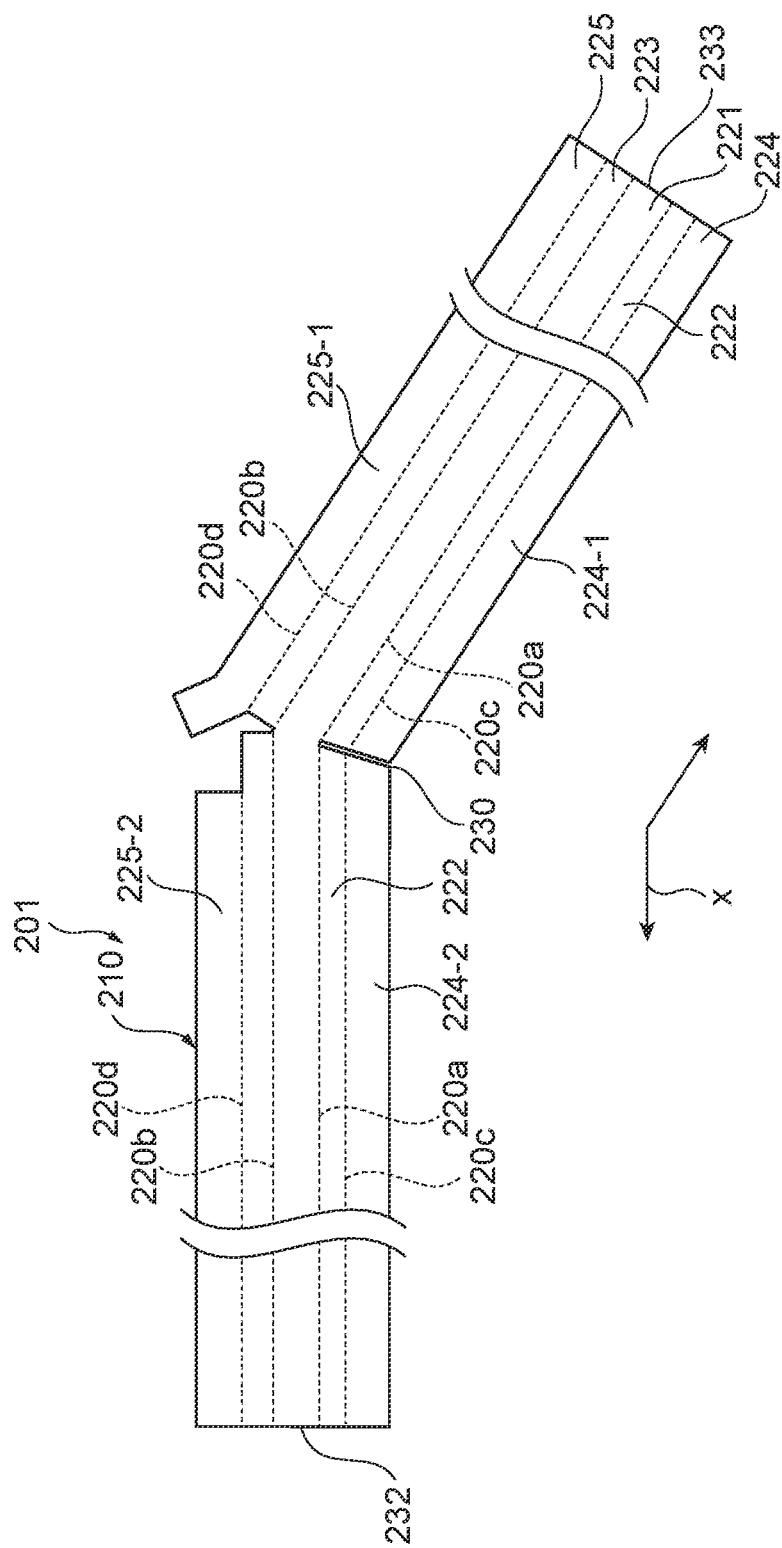
FIG. 10 A perspective view illustrating the exterior body for an electrical wire, shown in FIG. 9, in a developed state.

As illustrated in FIGS. 9 and 10, the inner lid wall part 224 is divided into the first portion 224-1 and the second portion 224-2 with the bent portion 230 being the boundary, in order to form the bent portion 230 in the wire exterior body 201.

The first portion 224-1 and the second portion 224-2 are adjacent to each other with the bent portion 230 being the boundary. In each of the first portion 224-1 and the second portion 224-2, one tip end portion in the longitudinal direction x is positioned at the bent portion 230. The first portion 224-1 extends from the other end portion 233 up to the bent portion 230, and the second portion 224-2 extends from the one end portion 232 up to the bent portion 230. Further, the inner lid wall part 224 extends almost parallel to the bottom wall part 221 from the side wall part 222 to the side wall part 223 or to the vicinity of the side wall part 223.

As shown in FIG. 9, in the first portion 225-1 of the outer lid wall part 225, an area from the bent portion 230 to the tip end portion (boundary portion 231) overlaps a partial area of the second portion 224-2 of the inner lid wall part 224 in a planar view to thereby form a wall-surface overlapping portion 235. Moreover, in the wire exterior body 201, in the wall-surface overlapping portion 235, the first portion 225-1 of the outer lid wall part 225 is joined to the second portion 224-2 of the inner lid wall part 224.

In the wire exterior body 201, the first portion 225-1 of the outer lid wall part 225 is joined to the second portion 224-2 of the inner lid wall part 224 in the boundary portion 231. When the first portion 225-1 of the outer lid wall part 225 is joined to the second portion 224-2 of the inner lid wall part 224 in the boundary portion 231, the first portion 225-1 and the second portion 225-2 of the outer lid wall part 225 and the second portion 224-2 of the inner lid wall part 224 can be joined together in one step, whereby efficiency of the joining work is improved.

A joining means between the first portion 225-1 of the outer lid wall part 225 and the second portion 224-2 of the inner lid wall part 224 is not limited particularly, and may include, for example, a welding means such as ultrasonic welding and heat welding, an adhering means such as an adhesive and an adhesive tape, a fitting means using a locking member, a rivet, and the like, a penetration fixing means using a stapler or the like, or the like. In the wire exterior body 201, since a joint portion 240 is formed using ultrasonic welding as a joining means, the first portion 225-1 of the outer lid wall part 225 is joined and fixed to the second portion 224-2 of the inner lid wall part 224.

Since the first portion 225-1 of the outer lid wall part 225 is fixed to the second portion 224-2 of the inner lid wall part 224, the first portion 225-1 of the outer lid wall part 225 is integrated with the second portion 224-2 of the inner lid wall part 224 via the wall-surface overlapping portion 235. The area of the wall-surface overlapping portion 235 in a planar view is not particularly limited, and is selectable as appropriate within a range that the first portion 225-1 of the outer lid wall part 225 and the second portion 224-2 of the inner lid wall part 224 can be fixed.

In the wire exterior body 201, the first portion 225-1 of the outer lid wall part 225 extending from the other end portion 233 is integrated with the second portion 224-2 of the inner lid wall part 224 extending from the one end portion 232, which can give excellent mechanical strength even in the bent portion 230. Accordingly, the wire exterior body 201 has an excellent protective function with respect to the wire harness 310. Moreover, the wire exterior body 201 having excellent workability for attaching the exterior-covered wire harness 300 to a vehicle body panel or the like can be obtained. Furthermore, since the bent portion 230 also has an excellent mechanical strength, even if the exterior-covered wire harness 300 is attached to a vehicle such as an automobile in which vibration is likely to be generated, it is possible to prevent vibration sound from being generated from the exterior-covered wire harness 300. Further, since the mechanical strength of the bent portion 230 is increased, durability of the bent portion 230 is improved.

A resin sheet to be used for the wire exterior body 201 is not particularly limited if it can be bent. As a resin type, either thermoplastic resin or thermosetting resin can be used. Among them, a thermoplastic resin foamed sheet is preferable from the viewpoint of light weight, freedom in shape design, cost, and the like. The resin type of the thermoplastic resin foamed sheet is not particularly limited, and includes, for example, polyethylene resin, polypropylene resin, polycarbonate resin, polyethylene terephthalate resin, polybutylene terephthalate resin, polyamide resin, polyphenylene sulfide resin, polystyrene resin, polyvinyl chloride resin, polyvinyl acetate resin, polytetrafluoroethylene resin, acrylic resin, or the like.

The density of the thermoplastic resin foamed sheet to be used for the wire exterior body 201 is not particularly limited. For example, from the viewpoint of improving the balance between light weight and mechanical strength, it is preferable that the density is 200 Kg/m$^3$ or more and 700 Kg/m$^3$ or less, and it is more preferable that the density is 300 Kg/m$^3$ or more and 600 Kg/m$^3$ or less, and it is particularly preferable that the density is 350 Kg/m$^3$ or more and 550 Kg/m$^3$ or less. Note that the density of the thermoplastic resin foamed sheet is measured on the basis of JIS K 7222.

The thickness of the thermoplastic resin foamed sheet is not particularly limited. From the viewpoint of bending easiness and mechanical strength, it is preferable that the thickness is 0.50 mm or more and 4.0 mm or less, and it is more preferable that the thickness is 0.8 mm or more and 3.0 mm or less.

The bending portions 220a to 220d may be extrusion-molded portions that are formed by extrusion molding performed on a flat thermoplastic resin foamed sheet so as to be in a shape easy for bending formation. Since the bending portions 220a to 220d are formed as extrusion-molded portions, bending processing can be performed smoothly, and accuracy of the bending positions can be improved.

In the thermoplastic resin foamed sheet, when the bending portions 220a to 220d are extrusion-molded portions, the density of the thermoplastic resin foamed sheet is higher than the wall parts 210 that are portions other than the bending portions 220a to 220d. The density of the thermoplastic resin foamed sheet in the bending portions 220a to 220d is not particularly limited. From the viewpoint of obtaining bending property of the bending portions 220a to 220d while stably maintaining the shape of the wire exterior body 201, it is preferable that the density is 400 Kg/m$^3$ or more and 1200 Kg/m$^3$ or less, and it is particular preferable that the density is 500 Kg/m$^3$ or more and 1200 Kg/m$^3$ or less. Note that the density of the bending portions 220a to 220d of the thermoplastic resin foamed sheet is measured on the basis of JIS K 7222, by returning the bent thermoplastic resin foamed sheet into flat and cutting off a width of 1 mm on the both sides from the bending portions 220a to 220d.

Note that the bending portions 220a to 220d may be in a shape easy for bending formation by forming a half-cut portions, a cut portion in a broken line shape, or the like, instead of an extrusion-molded portion.

Further, in the thermoplastic resin foamed sheet, a non-foam layer may be formed on both surfaces or either surface. That is, the thermoplastic resin foamed sheet may be formed to include a foam layer and a non-foam layer formed on the foam layer. When a non-foam layer is formed on a surface of the thermoplastic resin foamed sheet, the mechanical strength of the wire exterior body 201 is enhanced, and the protective performance for the wire harness 310 to be accommodated is improved. From the viewpoint of reliably enhancing the mechanical strength of the wire exterior body 201, it is preferable to form non-foam layers on both surfaces. The thickness of the non-form layer is not particularly limited and, for example, the thickness may be 10 µm or more and 100 µm or less.

The Shore hardness (HSC) of the thermoplastic resin foamed sheet is not particularly limited, but it is preferable that HSC is 60 or more and 100 or less from the viewpoint of mechanical strength.

Next, each of a method of forming the wire exterior body 201 described above and a method of forming the exterior-covered wire harness 300 by mounting the wire harness 310 on the wire exterior body 201 will be described. In the method of forming the wire exterior body 201, first, stamping is performed to stamp out a portion corresponding to the wire exterior body 201 from a thermoplastic resin foamed sheet serving as a base material for forming the wire exterior body 201. By the stamping being performed, a thermoplastic resin foamed sheet having the shape shown in FIG. 10 can be obtained. As stamping, for example, stamping using a Thomson blade mold can be considered from the viewpoint of cost reduction and easy processing. Note that when stamping using a Thomson blade is performed, by setting the shape of the blade appropriately, it is possible to form a curved portion having R 0.1 mm or larger and 1.0 mm or smaller on the cut surface of the thermoplastic resin foamed sheet. When the curved portion is formed, it is possible to prevent the wire harness 310 from being damaged by a contact of the wire harness 310 with an end portion of the thermoplastic resin foamed sheet.

Figure 11A:
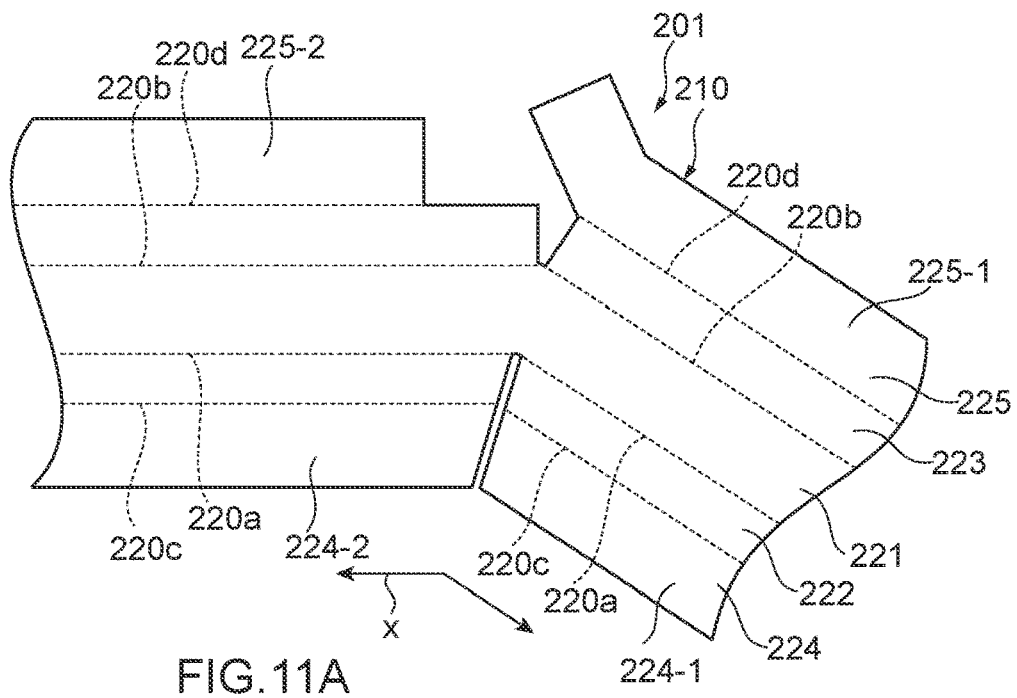
FIG. 11A, 11B, 11C An explanatory view of a method of assembling an exterior body for an electrical wire of an exemplary embodiment of the present invention.

In the method of mounting the wire exterior body 201, formed as described above, on the wire harness 310, first, the resin sheet cut out of the base material shown in FIG. 11A is bent at the bending portions 220a and 220b such that the side wall parts 222 and 223 become almost perpendicular to the bottom wall part 221. When the resin sheet is bent at the bending portions 220a and 220b, the space between the tip end portion sides of the side wall parts 222 and 223 opens upward along the longitudinal direction x.

Figure 11B:
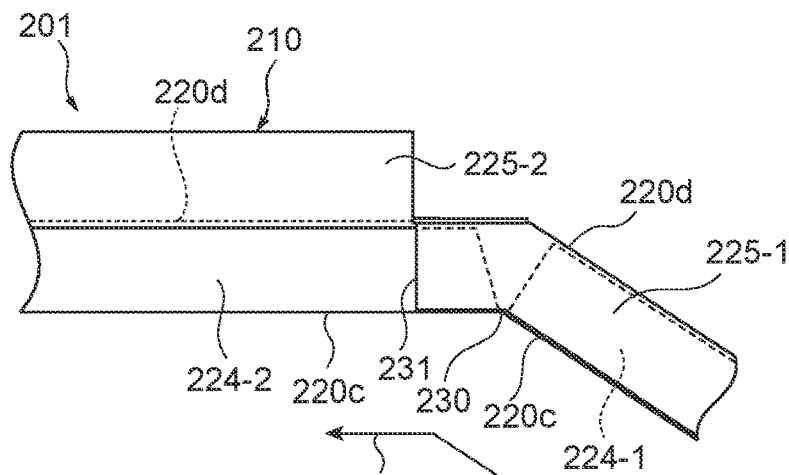

After the resin sheet is bent at the bending portions 220a and 220b and the wire harness (not shown in FIG. 11A, FIG. 11B, FIG. 11C) is placed on the bottom wall part 221, as shown in FIG. 11B, the first portion 224-1 and the second portion 224-2 of the inner lid wall part 224 are bent at the bending portion 220c such that the first portion 224-1 and the second portion 224-2 of the inner lid wall part 224 become almost parallel to the bottom wall part 221. Thereafter, the first portion 225-1 of the outer lid wall part 225 is bent at the bending portion 220d such that the first portion 225-1 of the outer lid wall part 225 becomes almost parallel to the bottom wall part 221. When the first portion 225-1 of the outer lid wall part 225 is bent at the bending portion 220d, the area from the bent portion 230 to the boundary portion 231, in the first portion 225-1 of the outer lid wall part 225, overlaps a partial area of the second portion 224-2 of the inner lid wall part 224, whereby the wall-surface overlapping portion 235 is formed.

Figure 11C:
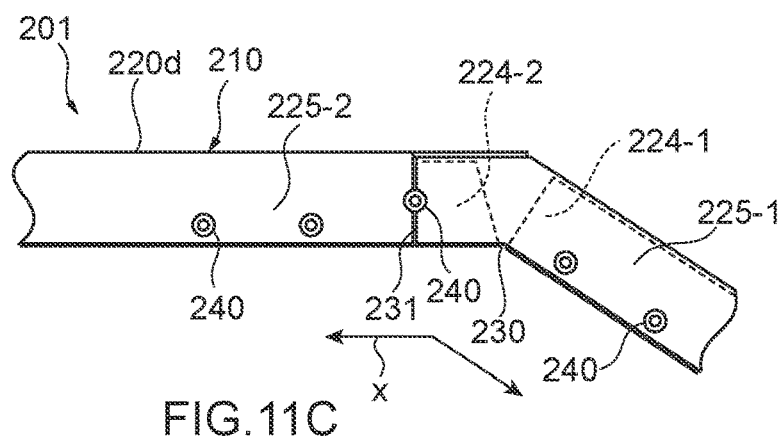

Thereafter, as shown in FIG. 11C, the second portion 225-2 of the outer lid wall part 225 is bent at the bending portion 220d such that the second portion 225-2 of the outer lid wall part 225 becomes almost parallel to the bottom wall part 221. When the second portion 225-2 of the outer lid wall part 225 is bent at the bending portion 220d, it is divided between the one end portion 232 in the longitudinal direction x of the wire exterior body 201 and the bent portion 230 to thereby form the outer lid wall part 225 in which the boundary portion 231 is formed. That is, when the outer lid wall part 225 is bent at the bending portion 220d, the opening between the tip end portions of the side wall parts 222 and 223 is closed to form the accommodating part, and the wire harness is accommodated in the accommodating part in an inserted state.

Thereafter, by performing ultrasonic welding or the like on the boundary portion 231, the first portion 225-1 and the second portion 225-2 of the outer lid wall part 225 and the second portion 224-2 of the inner lid wall part 224 are joined to form the joint portion 240. Further, when the outer lid wall part 225 and the inner lid wall part 224 are joined at an appropriate position other than the boundary portion 231 to form the joint portion 240, a state where the opening between the tip end portions of the side wall parts 222 and 223 is closed is fixed, and the wire exterior body 201 is mounted on the outer periphery of the wire harness.

Next, another exemplary embodiment of the present invention will be described. In the exemplary embodiment described above, each of a plurality of wall parts has a bent portion in the extending direction of the wire harness. Instead, the wall parts may include a branch portion in the extending direction of the wire harness, or may include both a bent portion and a branch portion. That is, when the first portion of the outer lid wall part is positioned at the branch portion, mechanical strength in the branch portion is improved. Furthermore, the diameter of the accommodating part may be increased or decreased so as to go along the shape of the wire harness.

INDUSTRIAL APPLICABILITY

In the present invention, excellent mechanical strength is achieved even in a branch portion and/or a bent portion, and an excellent protective function is achieved with respect to electric wires. Therefore, the present invention has high utility value in the field of exterior body of a wire harness to be routed in a vehicle and required various shapes, for example.

LIST OF REFERENCE SIGNS 1, 101 exterior-covered wire harness
2 wire harness
3, 103, 201 exterior body
4, 210 wall part
5, 213 accommodating part
20a, 20b, 20c, 20d bending portion
41 bottom wall part
42, 43 side wall part
44 lower lid wall part
44a edge
45 upper lid wall part
45a edge
47, 147 through-hole
48, 148 lower surface groove
49, 149 upper surface groove
61, 161 attaching member
62 exterior body-side engagement portion
63, 163 vehicle body-side engagement portion
64 bottom part
65 erecting part
66 insertion hole
67 base part
68, 168 pillar
69, 169 wing part
70 insertion part
147a narrow portion
147c wide portion
162 exterior body-side locking part
164 inner-side fixing part
165 outer-side fixing part
166 connecting part
224 inner lid wall part
224-1 first portion
224-2 second portion
225 outer lid wall part
225-1 first portion
225-2 second portion
230 bent portion
235 wall-surface overlapping portion
X longitudinal direction
Y short direction

The invention claimed is:

1. A wire exterior body to be mounted on an outer periphery of an electric wire, the wire exterior body being formed of a resin sheet that is bent, the wire exterior body comprising
a plurality of wall parts extending along an extending direction of the electric wire, the plurality of the wall parts forming an accommodating part that accommodates the electric wire, wherein
among the plurality of the wall parts, at least one wall part has a through-hole, penetrating in a thickness direction of the resin sheet, into which an attaching member attachable to a vehicle body is inserted, and a groove in which a thickness of the resin sheet is reduced is formed on a part around the through-hole on at least one surface of an upper surface and a lower surface facing the thickness direction.

2. The wire exterior body according to claim 1, wherein the groove is formed at positions facing each other over the through-hole.

3. The wire exterior body according to claim 1, wherein the groove is an annular groove surrounding the through-hole.

4. The wire exterior body according to claim 1, wherein a width of the groove is 0.7 mm or more and 0.9 mm or less.

5. The wire exterior body according to claim 1, wherein a depth of the groove is 60% or more and 80% or less of the thickness of the resin sheet.

6. The wire exterior body according to claim 1, wherein a density of the resin sheet in the groove is higher than a density of the resin sheet except for the groove in the upper surface and the lower surface facing the thickness direction, and is 400 Kg/m$^3$ or more and 1200 Kg/m$^3$ or less.

7. An exterior-covered wire harness comprising:
a wire harness; and
the wire exterior body according to claim 1, wherein the wire exterior body is mounted on an outer periphery of the wire harness.

8. A wire exterior body to be mounted on an outer periphery of an electric wire, the wire exterior body being formed of a resin sheet that is bent, the wire exterior body comprising
a plurality of wall parts extending along an extending direction of the electric wire, the plurality of the wall parts forming an accommodating part that accommodates the electric wire, wherein the plurality of the wall parts includes a branch portion and/or a bent portion in the extending direction of the electric wire, and among the plurality of the wall parts, two wall parts facing each other over the accommodating part are provided across the branch portion and/or bent portion along the extending direction of the electric wire.

9. The wire exterior body according to claim 8, wherein branching of the branch portion and/or bending of the bent portion is formed toward a short direction of the two wall parts facing each other.

10. The wire exterior body according to claim 8, wherein one wall part forming the two wall parts facing each other is joined to at least one of the plurality of the wall parts in a direction extending from the branch portion and/or bent portion.

11. The wire exterior body according to claim 8, wherein at least a partial area of one wall part forming the two wall parts facing each other includes a wall-surface overlapping portion that overlaps at least one of the plurality of the wall parts, and in the wall-surface overlapping portion, the one wall part is joined to at least one of the plurality of the wall parts.

12. The wire exterior body according to claim 11, wherein the one wall part is divided in the wall-surface overlapping portion to form a boundary portion, and the one wall part is joined to at least one of the plurality of the wall parts in the boundary portion.

13. The wire exterior body according to claim 8, wherein the resin sheet is a thermoplastic resin foamed sheet.

14. The wire exterior body according to claim 13, wherein a density of the thermoplastic resin foamed sheet except for a bending portion is 200 $Kg/m^3$ or more and 700 $Kg/m^3$ or less.

15. The wire exterior body according to claim 13, wherein a thickness of the thermoplastic resin foamed sheet except for a bending portion is 0.50 mm or more and 4.0 mm or less.

16. The wire exterior body according to claim 13, wherein a density of a bending portion of the thermoplastic resin foamed sheet is 400 $Kg/m^3$ or more and 1200 $Kg/m^3$ or less.

17. The wire exterior body according to claim 13, wherein the thermoplastic resin foamed sheet includes a curved portion having R 0.1 mm or more and 1.0 mm or less in a cut surface.

18. The wire exterior body according to claim 13, wherein the thermoplastic resin foamed sheet includes a non-foam layer on both surfaces.

19. The wire exterior body according to claim 18, wherein a thickness of the non-foam layer is 10 μm or more and 100 μm or less.

20. The wire exterior body according to any one of claim 13, wherein
Shore hardness (HSC) of the thermoplastic resin foamed sheet is 60 or more and 100 or less.

21. An exterior-covered wire harness comprising:
a wire harness; and
the wire exterior body according to claim 8, wherein the wire exterior body is mounted on an outer periphery of the wire harness.

* * * * *